(12) United States Patent
Robinson

(10) Patent No.: US 7,783,249 B2
(45) Date of Patent: Aug. 24, 2010

(54) PLAYING DIGITAL CONTENT FROM SATELLITE RADIO MEDIA BASED ON TASTE PROFILES

(75) Inventor: Gary Robinson, Bangor, ME (US)

(73) Assignee: Emergent Music LLC, Portland, ME (US)

( * ) Notice: Subject to any disclaimer, the term of this patent is extended or adjusted under 35 U.S.C. 154(b) by 485 days.

(21) Appl. No.: 11/974,634

(22) Filed: Oct. 15, 2007

(65) Prior Publication Data

US 2008/0261516 A1  Oct. 23, 2008

Related U.S. Application Data

(60) Division of application No. 11/230,274, filed on Sep. 19, 2005, now abandoned, which is a continuation-in-part of application No. PCT/US2005/02731, filed on Jan. 27, 2005.

(60) Provisional application No. 60/540,041, filed on Jan. 27, 2004, provisional application No. 60/611,222, filed on Sep. 18, 2004, provisional application No. 60/635,197, filed on Dec. 9, 2004.

(51) Int. Cl.
*H04H 40/00* (2008.01)

(52) U.S. Cl. .................. 455/3.06; 455/3.02; 455/432.3; 455/412.1; 455/186.1

(58) Field of Classification Search ................ 455/3.02, 455/3.03, 3.06, 412.1, 414.1, 414.2, 414.3, 455/425, 427, 432.3, 9, 12.1, 18, 514, 186.1; 386/126; 705/8, 14; 709/219, 224; 725/88, 725/102, 87

See application file for complete search history.

(56) References Cited

U.S. PATENT DOCUMENTS

| | | | |
|---|---|---|---|
| 2002/0002479 A1* | 1/2002 | Almog et al. | 705/8 |
| 2003/0189587 A1* | 10/2003 | White et al. | 345/716 |
| 2004/0236728 A1* | 11/2004 | Newman et al. | 707/3 |
| 2006/0010478 A1* | 1/2006 | White et al. | 725/102 |
| 2006/0059168 A1* | 3/2006 | Hamada et al. | 707/100 |
| 2007/0065122 A1* | 3/2007 | Chatterton | 386/126 |
| 2008/0126420 A1* | 5/2008 | Wright et al. | 707/104.1 |
| 2009/0055463 A1* | 2/2009 | Allibhoy et al. | 709/201 |
| 2010/0036945 A1* | 2/2010 | Allibhoy et al. | 709/224 |

* cited by examiner

*Primary Examiner*—Tan Trinh
(74) *Attorney, Agent, or Firm*—Gerry J. Elman; Elman Technology Law, P.C.

(57) ABSTRACT

A portable content-playing device which automatically constructs a virtual channel of content consistent with the tastes of the user of the device, where the content originates from one or more satellites. The portable device contains software for computing similarity values between a local taste profile (representative of the tastes of the user of the device) and taste profiles downloaded from one or more of the satellites, and this information is used in choosing the content of the virtual channel.

19 Claims, 2 Drawing Sheets

US 7,783,249 B2

PLAYING DIGITAL CONTENT FROM SATELLITE RADIO MEDIA BASED ON TASTE PROFILES

CROSS-REFERENCE TO RELATED APPLICATIONS

This application is a divisional of U.S. patent application Ser. No. 11/230,274, filed Sep. 19, 2005; which is a continuation-in-part of International Patent Application: PCT/US2005/02731, filed 27 Jan. 2005 for Enabling Recommendations and Community By Massively-Distributed Nearest-Neighbor Searching, which claims priority from and benefit of the following U.S. Provisional Patent Applications: 60/540,041 filed 27 Jan. 2004, for Enabling Recommendations and Community by Massively-Distributed Nearest-Neighbor Searching; 60/611,222 filed 18 Sep. 2004 for Community and Recommendation System; and 60/635,197 filed 9 Dec. 2004 for Community and Recommendation System. Applicant hereby claims priority from and benefit of the aforesaid applications 60/611,222 and 60/635,197. Applicant hereby incorporates by reference herein to the fullest extent allowed by law the entire disclosure of each of the aforesaid applications, including all text, drawings, and code whether on paper or machine-readable media.

RESERVATION OF COPYRIGHT

Copyright© 2003, 2004, 2005 Emergent Music LLC

This application includes material which is subject to copyright protection. The copyright owner has no objection to the facsimile reproduction by anyone of the patent disclosure as it appears in patent office files or records, but otherwise reserves all copyright rights whatsoever.

COMPACT DISC INCORPORATION BY REFERENCE

Applicants hereby incorporate by reference the entire contents of the material on the compact disc submitted concurrently herewith, and as listed below. The disc was created on 13 Aug. 2007. Applicants submit herewith two individual compact discs, each being identical to the other.

Size Mon Day Year File

./cooltunes/Goombah Help:
   3358 Aug 31 2004 bittorrent.html
   3455 Jul 14 2004 blogging.html
   3077 Aug 31 2004 contacting.html
   2621 Aug 31 2004 index.html
   2945 Aug 31 2004 install.html
   3097 Jul 14 2004 neighbors.html
   2842 Jul 14 2004 playingmusic.html
   4019 Aug 31 2004 prefs.html
   3086 Aug 31 2004 profiles.html
   3046 Jul 14 2004 recommendations.html
   2893 Jul 14 2004 suggestions.html
   2819 Jul 14 2004 terms.html
   2665 Jul 14 2004 upgrades.html
   5738 Jul 27 2004 web.html
   3145 Jul 14 2004 whatisit.html ./cooltunes/Goombah Help/images:
   (empty)

./cooltunes/bittorrent:
   6255 Sep 17 2004 bittorrentfetcherclass.py
   2001 Sep 17 2004 bittorrentfetcherclasstest.py
   1769 Jul 15 2004 bittorrenttimedfetcherclass.py
   1705 Jul 15 2004 bittorrenttimedfetcherclasstest.py
   2022 Aug 30 2004 btcreatetorrentsmain.py
   5061 Aug 30 2004 btdirectoryclass.py
   1112 Aug 30 2004 btdirectoryclassmain.py
   10396 Aug 30 2004 btdirectoryclasstest.py
   4786 Sep 2 2004 btseedmanagerclass.py
   5462 Aug 30 2004 btseedmanagerclasstest.py
   2346 Aug 11 2004 btseedsdaemonmain.py
   1149 Aug 11 2004 bttrackdaemonmain.py ./cooltunes/clustering:
   7780 Aug 20 2004 clusterbuilderclass.py
   1877 Aug 26 2004 clusterbuilderclassmain.py
   7512 Aug 20 2004 clusterbuilderclasstest.py
   17139 Jul 13 2004 clusterfitterclass.py
   12368 Jul 13 2004 clusterfitterclasstest.py
   1876 Aug 13 2004 clusteringcandidatesfileclass.py
   4060 Jun 9 2004 clusteringcandidatesfileclasstest.py
   1835 Jun 9 2004 extremes.py
   38421 Jul 16 2004 genrerankhandlerclass.py
   10305 Jul 13 2004 genrerankhandlerclassrefactorings.txt
   102592 Jul 13 2004 genrerankhandlerclasstest.py
   1778 Jun 2 2004 publicprofilestringclass.py
   1089 Jun 2 2004 publicprofilestringclasstest.py
   2315 Jun 9 2004 unique.py ./cooltunes/getblogurl:
   5715 Jul 26 2004 getblogurlclass.py ./cooltunes/initialcandidates:
   421 Jun 22 2004 ReadMe.Candidates.txt ./cooltunes/libchanges/BitTorrent:
   47 Jun 3 2004 BitTorrentVersion-3.4.2.txt
   9955 Jun 3 2004 Choker.py
   10802 Jun 3 2004 Connecter.py
   1016 Jun 3 2004 CurrentRateMeasure.py
   17734 Jun 3 2004 Downloader.py
   2855 Jun 3 2004 DownloaderFeedback.py
   18789 Jun 3 2004 Encrypter.py
   6054 Jun 3 2004 HTTPHandler.py
   2650 Jun 3 2004 NatCheck.py
   5014 Jun 3 2004 PiecePicker.py
   1503 Jun 3 2004 RateMeasure.py
   18347 Jun 3 2004 RawServer.py
   5653 Jun 3 2004 Rerequester.py
   5021 Jun 3 2004 Storage.py
   17029 Jun 3 2004 StorageWrapper.py
   8059 Jun 3 2004 Uploader.py
   18 Jun 3 2004 _init_.py
   7052 Jun 3 2004 bencode.py
   3733 Jun 3 2004 bitfield.py
   3831 Jun 3 2004 btformats.py
   12791 Jun 3 2004 download.py
   2240 Jun 3 2004 fakeopen.py
   3579 Jun 3 2004 parseargs.py
   2287 Jun 3 2004 selectpoll.py
   2052 Jun 3 2004 testtest.py
   24605 Jun 3 2004 track.py
   4261 Jun 3 2004 zurllib.py ./cooltunes/libchanges/macos/xml:
   1806 Apr 5 2004 FtCore.py
   389 Apr 5 2004 ReadMe.Bob.txt
   1083 Apr 5 2004 _init_.py
   9627 Apr 5 2004 ns.py ./cooltunes/libchanges/macos/xml/dom:
  4235 Apr 5 2004 Attr.py
  644 Apr 5 2004 CDATASection.py
  4094 Apr 5 2004 CharacterData.py
  603 Apr 5 2004 Comment.py
  1936 Apr 5 2004 DOMImplementation.py
  11948 Apr 5 2004 Document.py
  1296 Apr 5 2004 DocumentFragment.py
  3399 Apr 5 2004 DocumentType.py
  10264 Apr 5 2004 Element.py
  2610 Apr 5 2004 Entity.py
  1394 Apr 5 2004 EntityReference.py
  3438 Apr 5 2004 Event.py
  16628 Apr 5 2004 FtNode.py
  2259 Apr 5 2004 MessageSource.py
  5052 Apr 5 2004 NamedNodeMap.py
  937 Apr 5 2004 NodeFilter.py
  3998 Apr 5 2004 NodeIterator.py
  1442 Apr 5 2004 NodeList.py
  2056 Apr 5 2004 Notation.py
  2080 Apr 5 2004 ProcessingInstruction.py
  40190 Apr 5 2004 Range.py
  1195 Apr 5 2004 Text.py
  6995 Apr 5 2004 TreeWalker.py
  7545 Apr 5 2004 _init_.py
  3481 Apr 5 2004 domreg.py
  36379 Apr 5 2004 expatbuilder.py
  19289 Apr 5 2004 javadom.py
  5287 Apr 5 2004 minicompat.py
  65671 Apr 5 2004 minidom.py
  1274 Apr 5 2004 minitraversal.py
  11978 Apr 5 2004 pulldom.py
  12384 Apr 5 2004 xmlbuilder.py ./cooltunes/libchanges/macos/xml/dom/ext:
  11057 Apr 5 2004 Dom2Sax.py
  13835 Apr 5 2004 Printer.py
  2344 Apr 5 2004 Visitor.py
  1584 Apr 5 2004 XHtml2HtmlPrinter.py
  1634 Apr 5 2004 XHtmlPrinter.py
  10102 Apr 5 2004 _init_.py
  13186 Apr 5 2004 c14n.py ./cooltunes/libchanges/macos/xml/dom/ext/reader:
  3174 Apr 5 2004 HtmlLib.py
  3123 Apr 5 2004 HtmlSax.py
  8871 Apr 5 2004 PyExpat.py
  6381 Apr 5 2004 Sax.py
  15985 Apr 5 2004 Sax2.py
  8295 Apr 5 2004 Sax2Lib.py
  10310 Apr 5 2004 Sgmlop.py
  2207 Apr 5 2004 _init_.py ./cooltunes/libchanges/macos/xml/dom/html:
  9836 Apr 5 2004 GenerateHtml.py
  3788 Apr 5 2004 HTMLAnchorElement.py
  3411 Apr 5 2004 HTMLAppletElement.py
  2959 Apr 5 2004 HTMLAreaElement.py
  1309 Apr 5 2004 HTMLBRElement.py
  1501 Apr 5 2004 HTMLBaseElement.py
  1702 Apr 5 2004 HTMLBaseFontElement.py
  2361 Apr 5 2004 HTMLBodyElement.py
  2686 Apr 5 2004 HTMLButtonElement.py
  2175 Apr 5 2004 HTMLCollection.py
  1396 Apr 5 2004 HTMLDListElement.py
  1047 Apr 5 2004 HTMLDOMImplementation.py
  1405 Apr 5 2004 HTMLDirectoryElement.py
  1509 Apr 5 2004 HTMLDivElement.py
  11633 Apr 5 2004 HTMLDocument.py
  3572 Apr 5 2004 HTMLElement.py
  1299 Apr 5 2004 HTMLFieldSetElement.py
  1690 Apr 5 2004 HTMLFontElement.py
  3327 Apr 5 2004 HTMLFormElement.py
  3564 Apr 5 2004 HTMLFrameElement.py
  1497 Apr 5 2004 HTMLFrameSetElement.py
  2016 Apr 5 2004 HTMLHRElement.py
  1312 Apr 5 2004 HTMLHeadElement.py
  1314 Apr 5 2004 HTMLHeadingElement.py
  1312 Apr 5 2004 HTMLHtmlElement.py
  3894 Apr 5 2004 HTMLIFrameElement.py
  3888 Apr 5 2004 HTMLImageElement.py
  6481 Apr 5 2004 HTMLInputElement.py
  1553 Apr 5 2004 HTMLIsIndexElement.py
  1558 Apr 5 2004 HTMLLIElement.py
  1784 Apr 5 2004 HTMLLabelElement.py
  1798 Apr 5 2004 HTMLLegendElement.py
  3046 Apr 5 2004 HTMLLinkElement.py
  1377 Apr 5 2004 HTMLMapElement.py
  1396 Apr 5 2004 HTMLMenuElement.py
  1961 Apr 5 2004 HTMLMetaElement.py
  1514 Apr 5 2004 HTMLModElement.py
  1869 Apr 5 2004 HTMLOListElement.py
  5233 Apr 5 2004 HTMLObjectElement.py
  1623 Apr 5 2004 HTMLOptGroupElement.py
  3651 Apr 5 2004 HTMLOptionElement.py
  1322 Apr 5 2004 HTMLParagraphElement.py
  1949 Apr 5 2004 HTMLParamElement.py
  1364 Apr 5 2004 HTMLPreElement.py
  1283 Apr 5 2004 HTMLQuoteElement.py
  3150 Apr 5 2004 HTMLScriptElement.py
  4750 Apr 5 2004 HTMLSelectElement.py
  1811 Apr 5 2004 HTMLStyleElement.py
  1334 Apr 5 2004 HTMLTableCaptionElement.py
  4684 Apr 5 2004 HTMLTableCellElement.py
  2421 Apr 5 2004 HTMLTableColElement.py
  9117 Apr 5 2004 HTMLTableElement.py
  3711 Apr 5 2004 HTMLTableRowElement.py
  2877 Apr 5 2004 HTMLTableSectionElement.py
  4989 Apr 5 2004 HTMLTextAreaElement.py
  1837 Apr 5 2004 HTMLTitleElement.py
  1612 Apr 5 2004 HTMLUListElement.py
  36479 Apr 5 2004 _init_.py ./cooltunes/libchanges/macos/xml/marshal:
  359 Apr 5 2004 _init_.py
  20344 Apr 5 2004 generic.py
  10023 Apr 5 2004 wddx.py ./cooltunes/libchanges/macos/xml/parsers:
  43 Apr 5 2004 _init_.py
  116 Apr 5 2004 expat.py
  19361 Apr 5 2004 sgmllib.py ./cooltunes/libchanges/macos/xml/parsers/xmlproc:
  22 Apr 5 2004 _init_.py
  1657 Apr 5 2004 _outputters.py
  10134 Apr 5 2004 catalog.py
  6593 Apr 5 2004 charconv.py
  22875 Apr 5 2004 dtdparser.py
  33805 Apr 5 2004 errors.py
  4852 Apr 5 2004 namespace.py
  6752 Apr 5 2004 utils.py
  2340 Apr 5 2004 xcatalog.py
  7067 Apr 5 2004 xmlapp.py
  28475 Apr 5 2004 xmldtd.py
  19970 Apr 5 2004 xmlproc.py 32619 Apr 5 2004 xmlutils.py
10167 Apr 5 2004 xmlval.py ./cooltunes/libchanges/macos/xml/sax:
1602 Apr 5 2004 _init_.py
4662 Apr 5 2004 _exceptions.py
15122 Apr 5 2004 expatreader.py
14084 Apr 5 2004 handler.py
1250 Apr 5 2004 sax2exts.py
6617 Apr 5 2004 saxexts.py
15687 Apr 5 2004 saxlib.py
24428 Apr 5 2004 saxutils.py
18864 Apr 5 2004 writer.py
12580 Apr 5 2004 xmlreader.py ./cooltunes/libchanges/macos/xml/sax/drivers:
39 Apr 5 2004 _init_.py
1051 Apr 5 2004 drv_htmllib.py
3112 Apr 5 2004 drv_ltdriver.py
895 Apr 5 2004 drv_ltdriver_val.py
5893 Apr 5 2004 drv_pyexpat.py
979 Apr 5 2004 drv_sgmllib.py
2700 Apr 5 2004 drv_sgmlop.py
3685 Apr 5 2004 drv_xmldc.py
2709 Apr 5 2004 drv_xmllib.py
4402 Apr 5 2004 drv_xmlproc.py
1774 Apr 5 2004 drv_xmlproc_val.py
2509 Apr 5 2004 drv_xmltoolkit.py
3393 Apr 5 2004 pylibs.py ./cooltunes/libchanges/macos/xml/sax/drivers2:
39 Apr 5 2004 _init_.py
422 Apr 5 2004 drv_htmllib.py
5931 Apr 5 2004 drv_javasax.py
645 Apr 5 2004 drv_pyexpat.py
3759 Apr 5 2004 drv_sgmllib.py
4386 Apr 5 2004 drv_sgmlop.py
2467 Apr 5 2004 drv_sgmlop_html.py
13532 Apr 5 2004 drv_xmlproc.py ./cooltunes/libchanges/macos/xml/schema:
38 Apr 5 2004 _init_.py
60039 Apr 5 2004 trex.py ./cooltunes/libchanges/macos/xml/unicode:
158 Apr 5 2004 _init_.py
2863 Apr 5 2004 iso8859.py
11690 Apr 5 2004 utf8_iso.py ./cooltunes/libchanges/macos/xml/utils:
22 Apr 5 2004 _init_.py
26221 Apr 5 2004 characters.py
5676 Apr 5 2004 iso8601.py
6160 Apr 5 2004 qp_xml.py ./cooltunes/libchanges/macos/xml/xpath:
9457 Apr 5 2004 BuiltInExtFunctions.py
2193 Apr 5 2004 Context.py
5865 Apr 5 2004 Conversions.py
11233 Apr 5 2004 CoreFunctions.py
1159 Apr 5 2004 ExpandedNameWrapper.py
996 Apr 5 2004 MessageSource.py
757 Apr 5 2004 NamespaceNode.py
2047 Apr 5 2004 ParsedAbbreviatedAbsoluteLocationPath.py
2137 Apr 5 2004 ParsedAbbreviatedRelativeLocationPath.py
1228 Apr 5 2004 ParsedAbsoluteLocationPath.py
9080 Apr 5 2004 ParsedAxisSpecifier.py
21415 Apr 5 2004 ParsedExpr.py
5443 Apr 5 2004 ParsedNodeTest.py
2483 Apr 5 2004 ParsedPredicateList.py
1464 Apr 5 2004 ParsedRelativeLocationPath.py
3414 Apr 5 2004 ParsedStep.py
951 Apr 5 2004 Set.py
6005 Apr 5 2004 Util.py
34402 Apr 5 2004 XPathGrammar.py
37104 Apr 5 2004 XPathParser.py
2924 Apr 5 2004 XPathParserBase.py
3192 Apr 5 2004 _init_.py
11280 Apr 5 2004 pyxpath.py
6236 Apr 5 2004 yappsrt.py ./cooltunes/macui:
3993 Apr 5 2004 Building_coolTunes.txt
528 Apr 5 2004 Credits.html
2142 May 10, 2004 alertdialogclasstestmanually.py
3022 Jul 26 2004 buildapp.py
144 May 10, 2004 buildapp_alertdialgoclasstestscript.py
171 Jul 21 2004 buildapp_macpleasewaitdialogclasstestscript.py
143 Jun 23 2004 buildapp_opendialogclasstestscript.py
164 Apr 16 2004 buildapp_progressdialogclasstestscript.py
4232 Jun 22 2004 builddiskimage.sh
310 Apr 5 2004 clearuser.sh
134519 Sep 17 2004 cooltunescontrollerclass.py
277 Apr 6 2004 cooltunescontrollerclasstest.py
763 Jul 26 2004 cooltunesmain.py
6491 Apr 16 2004 itunesdbreaderclass.py
845 Jul 26 2004 itunesdbreaderprogressslavemain.py
10655 Sep 13 2004 itunesdbreaderslaveclass.py
859 Jul 26 2004 itunesdbreaderslavemain.py
3183 Apr 5 2004 itunesscripterclass.py
1134 May 10, 2004 macalertdialogclass.py
1009 Jun 23 2004 macopendialogclass.py
3874 Jul 21 2004 macpleasewaitdialogclass.py
1644 Aug 20 2004 macpleasewaitdialogclasstest.py
5411 May 10, 2004 macprogressdialogclass.py
1110 Apr 16 2004 nibutilities.py
1533 Jun 23 2004 opendialogclasstestmanually.py
13767 Jul 26 2004 preffileclass.py
1189 Jun 4 2004 preffileclasstest.py
1595 Apr 16 2004 progressdialogclasstest.py ./cooltunes/patterns:
1497 Jun 24 2004 immutablelistclass.py
6695 Apr 5 2004 observermixin.py
8089 Apr 5 2004 older
8143 Apr 5 2004 persistencemixin.py
4347 Apr 5 2004 singletonautopersistence.py
8642 Jun 10 2004 singletonmixin.py
4355 Apr 5 2004 synchronization.py ./cooltunes/pyclient:
850 Jun 11 2004 alertdialogclass.py
6829 Jul 23 2004 candidatefileclass.py
11120 Aug 20 2004 candidatefileclasstest.py
12624 Sep 17 2004 candidatefilefetcherclass.py
9823 Sep 16 2004 candidatefilefetcherclasstest.py
1869 May 13, 2004 candidatefileneighborretrieverclass.py
3502 May 13, 2004 candidatefileneighborretrieverclasstest.py
397 Jul 23 2004 clientemail.py
593 Jul 23 2004 clientemailtest.py
42266 Sep 17 2004 cooltunesclass.py
15103 Jul 29 2004 cooltunesclasstest.py
26 Jun 22 2004 cooltunesversion.py 3578 Apr 6 2004 currentclientversionclass.py
3899 Apr 14 2004 currentclientversionclasstest.py
5476 Aug 10 2004 daemonize.py
4235 Aug 20 2004 errorloggerclass.py
3000 Apr 14 2004 errorloggerclasstest.py
3084 Aug 2 2004 filteredrecommenderclass.py
4745 Aug 2 2004 filteredrecommenderclasstest.py
1042 Jun 9 2004 genreprofilerclass.py
1207 Jun 9 2004 genreprofilerclasstest.py
17125 Aug 25 2004 goombahserverclass.py
25439 Aug 20 2004 goombahserverclasstest.py
1991 Apr 6 2004 heartbeatclass.py
1498 Apr 14 2004 heartbeatclasstest.py
776 Apr 6 2004 listutilities.py
2015 Apr 6 2004 listutilitiestest.py
10666 Jul 27 2004 musicurlclass.py
10843 Jul 27 2004 musicurlclasstest.py
6362 Jul 16 2004 neighborbagclass.py
4886 May 12, 2004 neighborclass.py
15170 Sep 17 2004 neighborscannerclass.py
11853 Sep 17 2004 neighborscannerclasstest.py
863 Jul 26 2004 neighborscannerprogressslavemain.py
6191 Sep 16 2004 neighborscannerslaveclass.py
259 Apr 6 2004 neighborscannerslaveclasstest.py
875 Jul 26 2004 neighborscannerslavemain.py
5326 Apr 16 2004 neighborsearcherclass.py
39195 Jul 26 2004 neighborsearcherslaveclass.py
4868 Aug 10 2004 normalize.py
49 Jul 15 2004 normalizefastcompile.sh
278 Jul 15 2004 normalizefastsetup.py
5121 Jul 15 2004 normalizefasttest.py
7182 Jul 15 2004 normalizetest.py
4821 Jun 7 2004 onewayfileclass.py
1218 Apr 14 2004 onewayfileclasstest.py
612 Jun 23 2004 opendialogclass.py
15710 Jul 16 2004 openexclusive.py
5089 Apr 6 2004 openexclusivetest.py
3928 Apr 8 2004 picklepipeclass.py
6662 Apr 14 2004 picklepipeclasstest.py
706 Apr 8 2004 picklepipeclasstestwriter.py
1316 Jul 21 2004 pleasewaitdialogclass.py
24019 Jul 21 2004 plisthandlerclass.py
5930 Jul 21 2004 plisthandlerclasstest.py
3654 Jul 21 2004 processprogressclass.py
3248 Jul 21 2004 processprogressclasstest.py
4145 May 7, 2004 progressdialogclass.py
39746 Aug 2 2004 recommenderclass.py
11977 Aug 5 2004 recommenderhandlerclass.py
12262 Jul 14 2004 recommenderhandlerclasstest.py
13947 Jul 26 2004 slaveprocessclass.py
1744 Jun 15 2004 slaveprocessclasstest.py
3539 Jun 4 2004 sortedneighborlistclass.py
4951 Jun 4 2004 sortedneighborlistclasstest.py
50519 Aug 5 2004 tasteprofileclass.py
572 Jul 23 2004 tasteprofileclassrefactorings.txt
4460 Aug 5 2004 tasteprofileclasstest.py
1269 Apr 14 2004 test.py
436 Jun 15 2004 testidlerclass.py
5001 Sep 17 2004 timeutilities.py
7047 Sep 17 2004 timeutilitiestest.py
9366 Apr 5 2004 traceclass.py
1336 Aug 4 2004 transposeexceptions.py
4503 Jul 29 2004 userclass.py
208 Jul 15 2004 userclasstest.py
7902 Apr 5 2004 userdefaultsclass.py
4794 Aug 13 2004 userpathsclass.py
3701 Jul 26 2004 userpathsclasstest.py 12875 Aug 20 2004 utilities.py
13770 Jun 7 2004 utilitiestest.py
6607 Jul 26 2004 versioncheckerclass.py
3728 Sep 17 2004 viewfactoryclass.py
2267 Apr 5 2004 build.xml
2392 Jun 23 2004 web.xml ./cooltunes/webserver/WEB-INF/conf:
   37329 Jul 28 2004 TurbineResources.properties ./cooltunes/webserver/WEB-INF/lib:
   (empty)

./cooltunes/webserver/database:
   2802 Aug 11 2004 MysqlSchema.sql
   309 Apr 5 2004 backup-goo.sh ./cooltunes/webserver/java/com/transpose/cooltunes:
   3912 Apr 5 2004 BlogList.java
   5501 Aug 11 2004 BlogPostList.java
   863 Apr 5 2004 CTBlog.java
   4515 Apr 5 2004 CTBlogPost.java
   2230 Jun 2 2004 ClusteringCandidatesFileWriter.java
   1151 Jun 2 2004 ClusteringCandidatesSaver.java
   983 Apr 5 2004 GeneralComment.java
   7257 Aug 11 2004 GeneralCommentList.java
   7811 Apr 5 2004 NearestNeighbor.java
   6481 Apr 5 2004 News.java
   3223 Apr 5 2004 NewsList.java
   8129 Jun 2 2004 PublicProfile.java
   17063 Aug 20 2004 RPC2Handler.java
   14403 Jun 2 2004 User.java ./cooltunes/webserver/java/com/transpose/cooltunes/servlets:
   764 Apr 5 2004 AppInit.java
   7013 Apr 5 2004 BlogServlet.java
   4432 Apr 5 2004 GeneralCommentServlet.java
   671 Apr 5 2004 HelloWorld.java
   6371 Apr 5 2004 LoginServlet.java
   1277 Apr 5 2004 RPC2.java
   6611 Aug 11 2004 UserServlet.java ./cooltunes/webserver/java/com/transpose/libs:
   (empty)

./cooltunes/webserver/java/com/transpose/util:
   321 Apr 5 2004 KeyNotFoundException.java
   1026 Apr 5 2004 Mailer.java
   1313 Apr 5 2004 XmlRpcFault.java ./cooltunes/webserver/jsps:
   2088 Sep 16 2004 about.jsp
   1621 Apr 5 2004 blogitem.jsp
   953 Apr 5 2004 blogs.jsp
   28831 Apr 5 2004 clickwrap.jsp
   1345 Sep 13 2004 contact.jsp
   1550 Apr 5 2004 createblog.jsp
   2600 Apr 5 2004 createuser.jsp
   360 Apr 5 2004 dbtest.jsp
   1551 Sep 13 2004 discussion.jsp
   3402 Sep 13 2004 download.jsp
   11304 Apr 5 2004 editblog.jsp
   7628 Sep 13 2004 faq.jsp
   308 Sep 13 2004 getNumUsers.jsp
   2169 Sep 13 2004 index.jsp
   1899 Sep 13 2004 login.jsp
   520 Apr 5 2004 logout.jsp
   1028 Apr 5 2004 mailpassword.jsp
   1656 Sep 13 2004 privacy.jsp
   2612 Apr 5 2004 releases.jsp 1008 Apr 5 2004 send_verification.jsp
2528 Apr 5 2004 startdiscussion.jsp
1045 Apr 5 2004 style.css
394 Jun 2 2004 test.jsp
293 Jun 2 2004 testclusteringcandidates.jsp
3139 Sep 13 2004 tos.jsp
1078 Apr 5 2004 verify.jsp
171 Apr 5 2004 verify_mailed.jsp
6687 Apr 5 2004 viewblog.jsp
962 Apr 5 2004 viewblogbyuser.jsp
3340 Apr 5 2004 viewdiscussion.jsp
3371 Apr 5 2004 viewforum.jsp ./cooltunes/webserver/.jsps/images:
  (empty)

./cooltunes/webserver/jsps/includes:
  0 Apr 5 2004 announcement.jsp
  1706 Sep 13 2004 beginbody.jsp
  731 Sep 13 2004 endbody.jsp
  0 Apr 5 2004 footer.jsp
  0 Apr 5 2004 header.jsp
  455 Apr 5 2004 jspheader.jsp
  2017 Sep 17 2004 build.xml
  5524 May 20 2004 web.xml ./songsifter/WEB-INF/conf:
  38247 May 20 2004 TurbineResources.properties ./songsifter/WEB-INF/tlds:
  (empty)

./songsifter/database:
  13853 May 20 2004 DemoSchema.sql
  5377 May 20 2004 MusicNewsSchema.sql
  13306 May 20 2004 MysqlSchema.sql
  702 May 20 2004 NewsSchema.sql
  1906 May 20 2004 OracleClearData.sql
  185 May 20 2004 OracleEMCreator.sql
  1975 May 20 2004 OracleFixSequences.sql
  3829 May 20 2004 OracleInitValues.sql
  3132 May 20 2004 OracleJDBCUser.sql
  14427 May 20 2004 OracleSchema.sql
  625 May 20 2004 RepairCTXIndexes.sql
  5450 May 20 2004 SuggestionSchema.sql
  214 May 20 2004 oraclecommands.txt
  340 May 20 2004 savepoints.sql
  1082 May 20 2004 seq.temp.sql ./songsifter/java/com/transpose:
  780 May 20 2004 Makefile
  1774 May 20 2004 Makefile.include ./songsifter/java/com/transpose/deed:
  6160 May 20 2004 AuctionItem.java
  28528 May 20 2004 BackgroundInfo.java
  6881 May 20 2004 BestDeedList.java
  4896 May 20 2004 Bid.java
  2520 May 20 2004 Blog.java
  4856 May 20 2004 BlogIDFanID.java
  10927 Aug 11 2004 BlogPost.java
  976 May 20 2004 ChangedBestDeedList.java
  575 May 20 2004 ChangedDeedList.java
  5094 May 20 2004 ClickThru.java
  10806 May 20 2004 DBTableNames.java
  383 May 20 2004 DBTableSelector.java
  41674 May 20 2004 Deed.java
  12631 May 20 2004 DeedAndChildList.java
  8487 May 20 2004 DeedComment.java
  922 May 20 2004 DeedIDAndLevel.java
  973 May 20 2004 DeedList.java
  11195 May 20 2004 DeedListImplementor.java
  19138 May 20 2004 DeedRating.java
  3576 May 20 2004 DeedRatingTable.java
  2501 May 20 2004 DeedTable.java
  7493 May 20 2004 Deed_Fan.java
  15610 Aug 11 2004 DiscussionComment.java
  1419 May 20 2004 FanDeedList.java
  4467 May 20 2004 Forum.java
  3781 May 20 2004 ForumList.java
  3866 May 20 2004 K2Factory.java
  5387 May 24 2004 K2User.java
  3236 May 20 2004 K2UserList.java
  3937 May 20 2004 K2UserOption.java
  4497 May 20 2004 K2UserPoints.java
  26110 May 20 2004 K2UserValue.java
  4248 May 20 2004 K2UserValueTable.java
  3880 May 20 2004 MailingList.java
  249 May 20 2004 Makefile
  4292 May 20 2004 NeedRatingDeedListImplementor.java
  264 May 20 2004 NotEnoughPointsException.java
  4883 May 20 2004 NotifyEvent.java
  10955 May 20 2004 PointsChange.java
  5100 May 20 2004 PointsChangeTable.java
  249 May 20 2004 Searchable.java
  2627 May 20 2004 SearchableDeedListImplementor.java
  18586 May 20 2004 Topic.java
  8916 May 20 2004 TopicComment.java
  2714 May 20 2004 TopicTable.java ./songsifter/java/com/transpose/deed/servlets:
  5009 May 20 2004 DeedServlet.java
  3046 May 20 2004 EditDeedServlet.java
  250 May 20 2004 Makefile
  4993 May 20 2004 ModeratorCommentServlet.java
  1151 May 20 2004 ServletParameterException.java
  3938 May 20 2004 StoreDeedServlet.java ./songsifter/java/com/transpose/deed/test:
  580 May 20 2004 testclickthru.jsp
  817 May 20 2004 testcounts.jsp
  1128 May 20 2004 testdeednumbers.jsp
  1465 May 20 2004 testdeedsforfan.jsp
  1376 May 20 2004 testhistory.jsp
  930 May 20 2004 testlatest.jsp
  1996 May 20 2004 testneediest.jsp
  611 May 20 2004 testoriginaldeed.jsp
  1057 May 20 2004 testresetbest.jsp ./songsifter/java/com/transpose/k2math:
  293 May 20 2004 InconsistentDataException.java
  26034 May 20 2004 K2MathClass.java
  243 May 20 2004 Makefile
  345 May 20 2004 NotEnoughDataException.java
  203 May 20 2004 PleaseStopException.java
  22809 May 20 2004 ProcessBackgroundRatingCut-offs.java
  78082 May 20 2004 ProcessDirtyDeedRatings.java
  19116 May 20 2004 ReinitializeMath.java ./songsifter/java/com/transpose/libs:
  (empty)

./songsifter/java/com/transpose/my:
  5616 May 20 2004 Affinity.java
  2440 May 20 2004 EmailAFriendTopic.java
  4849 May 20 2004 Fan_Affinity.java
  3725 May 20 2004 Fan_AffInityList.java
  6295 May 20 2004 K2MYFactory.java 4595 May 20 2004 Login.java
885 May 20 2004 MYBackgroundInfo.java
4886 May 20 2004 MYBestDeedList.java
1313 May 20 2004 MYChangedBestDeedList.java
1302 May 20 2004 MYChangedDeedList.java
10778 May 20 2004 MYDeed.java
493 May 20 2004 MYDeedList.java
2638 May 20 2004 MYDeedListImplementor.java
1353 May 20 2004 MYDeedRating.java
3481 May 20 2004 MYFan.java
6064 May 20 2004 MYFanList.java
4092 May 20 2004 MYFanOption.java
919 May 20 2004 MYFanValue.java
680 May 20 2004 MYPointsChange.java
2392 May 20 2004 MYScheduledTasks.java
9724 May 20 2004 MYTopic.java
997 May 20 2004 MYTopicComment.java
1172 May 20 2004 MYUser.java
245 May 20 2004 Makefile
537 May 20 2004 ProcessBackgroundMYRatingCutoffs.java
656 May 20 2004 ProcessDirtyMYDeedRatings.java
1066 May 20 2004 ProcessDirtyMYDeedRatingsScheduledTask.java
1055 May 20 2004 ProcessMYBGInfoScheduledTask.java ./songsifter/java/com/transpose/my/servlets:
797 May 20 2004 AppInit.java
18270 May 20 2004 CreateMYDeedServlet.java
8622 May 20 2004 CreateMYPersonServlet.java
5498 May 20 2004 DeedRatingServlet.java
4718 May 20 2004 EditMYDeedServlet.java
28926 May 20 2004 FanServlet.java
7032 May 20 2004 LoginServlet.java
3057 May 20 2004 MYTopicCommentServlet.java
248 May 20 2004 Makefile
4487 May 20 2004 StoreMYDeedServlet.java
4226 May 20 2004 UploadMYPictureServlet.java ./songsifter/java/com/transpose/scheduledjobs:
2707 May 20 2004 JobMinder.java
939 May 20 2004 JobMinderScheduledTask.java
247 May 20 2004 Makefile
326 May 20 2004 PoliteRunnable.java
9403 May 20 2004 ScheduledTask.java
1746 May 20 2004 ScheduledTaskList.java
1774 May 20 2004 TestScheduledTask.java ./songsifter/java/com/transpose/songdeed:
12702 May 20 2004 AlbumAuctionItem.java
7716 May 20 2004 AlbumAuctionItemList.java
1026 May 20 2004 AlbumBid.java
4161 May 20 2004 Announcement.java
3736 May 20 2004 ArtistList.java
2894 Aug 11 2004 ArtistWeeklyEmailMessage.java
4860 May 20 2004 BlogSongs.java
927 May 20 2004 BlogSongsScheduledTask.java
4827 May 20 2004 EMScheduledTasks.java
5051 May 20 2004 EmailAFriend.java
2519 May 20 2004 EmailAFriendTopic.java
25661 Aug 11 2004 Fan.java
6681 May 20 2004 FanList.java
4076 May 20 2004 FanOption.java
11085 May 20 2004 FanSongPointsChangesList.java
4705 May 20 2004 Fan_Genre.java
3905 May 20 2004 Fan_GenreList.java
996 May 20 2004 GeneralComment.java
6984 Aug 11 2004 GeneralCommentList.java
4107 May 20 2004 Genre.java
6712 May 20 2004 K2SongFactory.java
458 May 20 2004 LinkEntry.java
4682 May 20 2004 Login.java
4397 May 20 2004 LoginList.java
251 May 20 2004 Makefile
1616 May 20 2004 NeedRatingDeedList.java
6044 May 20 2004 News.java
3349 May 20 2004 NewsList.java
5396 May 20 2004 ProcessArtistWeeklyPromotionEmail.java
1203 May 20 2004 ProcessArtistWeeklyPromotionEmailScheduledTask.java
1518 May 20 2004 ProcessAuctionResults.java
1049 May 20 2004 ProcessAuctionResultsScheduledTask.java
577 May 20 2004 ProcessBackgroundSongRatingCutoffs.java
4400 May 20 2004 ProcessBids.java
1254 May 20 2004 ProcessBidsDollars.java
1025 May 20 2004 ProcessBidsDollarsScheduledTask.java
1245 May 20 2004 ProcessBidsPoints.java
993 May 20 2004 ProcessBidsPointsScheduledTask.java
708 May 20 2004 ProcessDirtySongDeedRatings.java
1107 May 20 2004 ProcessDirtySongDeedRatingsScheduledTask.java
1098 May 20 2004 ProcessSongBGInfoScheduledTask.java
3318 May 20 2004 ProcessTopScorerContest.java
1103 May 20 2004 ProcessTopScorerContestScheduledTask.java
5514 May 20 2004 PromotedTopic.java
764 May 20 2004 PromotedTopicDollars.java
4121 May 20 2004 PromotedTopicList.java
678 May 20 2004 PromotedTopicListDollars.java
672 May 20 2004 PromotedTopicListPoints.java
759 May 20 2004 PromotedTopicPoints.java
12168 Aug 11 2004 RPC2Handler.java
526 May 20 2004 ReinitializeSongMath.java
903 May 20 2004 SongBackgroundInfo.java
1309 May 20 2004 SongBestDeedList.java
1327 May 20 2004 SongChangedBestDeedList.java
1316 May 20 2004 SongChangedDeedList.java
22561 May 20 2004 SongDeed.java
1005 May 20 2004 SongDeedComment.java
514 May 20 2004 SongDeedList.java
2651 May 20 2004 SongDeedListImplementor.java
602 May 20 2004 SongDeedListSearcher.java
618 May 20 2004 SongDeedNotifyEvent.java
1433 May 20 2004 SongDeedRating.java
3573 May 20 2004 SongDeedValidator.java
3413 May 20 2004 SongDeed_Fan.java
821 May 20 2004 SongFanDeedList.java
933 May 20 2004 SongFanValue.java
8473 May 20 2004 SongLink.java
688 May 20 2004 SongPointsChange.java
4190 May 20 2004 SongSearchBestDeedList.java
11881 May 20 2004 SongTopic.java
7714 May 20 2004 SongTopicBid.java
776 May 20 2004 SongTopicBidDollars.java
915 May 20 2004 SongTopicBidDollarsList.java
4802 May 20 2004 SongTopicBidList.java
774 May 20 2004 SongTopicBidPoints.java
925 May 20 2004 SongTopicBidPointsList.java 1015 May 20 2004 SongTopicComment.java
4888 May 20 2004 Vendor.java ./songsifter/java/com/transpose/songdeed/jobs:
   639 May 20 2004 processbids.jsp
   497 May 20 2004 processsongratings.jsp ./songsifter/java/com/transpose/songdeed/servlets:
   7637 May 20 2004 AlbumBidServlet.java
   841 May 20 2004 AppInit.java
   4995 May 20 2004 AuctionServlet.java
   5335 May 20 2004 DeedRatingServlet.java
   5598 May 20 2004 EditSongDeedServlet.java
   28595 May 20 2004 FanServlet.java
   3695 May 20 2004 GeneralCommentServlet.java
   7034 May 20 2004 LoginServlet.java
   254 May 20 2004 Makefile
   2334 May 20 2004 NewsServlet.java
   4153 May 20 2004 PayPalServlet.java
   1148 May 20 2004 RPC2.java
   3067 May 20 2004 SongDeedCommentServlet.java
   925 May 20 2004 SongModeratorCommentServlet.java
   629 May 20 2004 SongTopicBidDollarsServlet.java
   626 May 20 2004 SongTopicBidPointsServlet.java
   5988 May 20 2004 SongTopicBidServlet.java
   3100 May 20 2004 SongTopicCommentServlet.java
   778 May 20 2004 SpendMyPointsServlet.java
   1590 May 20 2004 StoreSongDeedServlet.java
   4572 May 20 2004 StressTestServlet.java ./songsifter/java/com/transpose/songdeed/test:
   866 May 20 2004 addToFanGenreList.jsp
   1102 May 20 2004 reloadblog.jsp
   832 May 20 2004 testannouncement.jsp
   634 May 20 2004 testartistwebsite.jsp
   469 May 20 2004 testblog.jsp
   847 May 20 2004 testdeedfanlist.jsp
   2043 May 20 2004 testerror.jsp
   2134 May 20 2004 testfanoption.jsp
   979 May 20 2004 testfanpoints.jsp
   562 May 20 2004 testgenres.jsp
   829 May 20 2004 testgetlink.jsp
   3703 May 20 2004 testpoints.jsp
   792 May 20 2004 testpromotedtopiclist.jsp
   1636 May 20 2004 testsearch.jsp
   696 May 20 2004 testshowsongdeed.jsp
   3179 May 20 2004 testsongdeed.jsp
   724 May 20 2004 testsongdeed_fan.jsp
   911 May 20 2004 testsongdeedhistoryvector.jsp
   1534 May 20 2004 testsongdeedlist.jsp
   4594 May 20 2004 testsongdeedrating.jsp
   681 May 20 2004 testsongdeedvalue.jsp
   755 May 20 2004 testsongfanvalue.jsp
   997 May 20 2004 testsongtopicbid.jsp
   1105 May 20 2004 testsongtopicbidlist.jsp
   1131 May 20 2004 testsongtopicbidpointslist.jsp
   1827 May 20 2004 testsongtopiccomment.jsp
   902 May 20 2004 testsongtopiccommentdate.jsp
   1366 May 20 2004 testsongtopiccommentlist.jsp
   1063 May 20 2004 testsongtopicexists.jsp ./songsifter/java/com/transpose/tags:
   803 Jul 28 2004 DisplayAIM.java
   7129 Jul 28 2004 DisplayDeedHistory.java
   1763 Jul 28 2004 DisplayGenreCheckboxList.java
   1349 Jul 28 2004 DisplayGenreCheckboxListLoggedIn.java
   994 Jul 28 2004 DisplayGenreDropDown.java
   806 Jul 28 2004 DisplayICQ.java
   1633 Jul 28 2004 DisplayLatestDetailedNews.java
   1179 Jul 28 2004 DisplayLatestNews.java
   3351 Jul 28 2004 DisplayListNavigation.java
   3912 Jul 28 2004 DisplayPlainMusicLinks.java
   1217 Jul 28 2004 DisplayPresetGenreDropDown.java
   375 Jul 28 2004 DisplaySongBestDeedList.java
   421 Jul 28 2004 DisplaySongChangedBestDeedList.java
   413 Jul 28 2004 DisplaySongChangedDeedList.java
   16634 Jul 28 2004 DisplaySongDeedList.java
   893 Jul 28 2004 DisplaySongFanDeedList.java
   3371 Jul 28 2004 DisplaySongLinks.java
   907 Jul 28 2004 DisplaySongNeedyDeedList.java
   1385 Jul 28 2004 DisplaySongSearchBestDeedList.java
   2945 Jul 28 2004 DisplayTopScorers.java
   2857 Jul 28 2004 DisplayTopScorersToday.java
   1366 Jul 28 2004 DisplayTopScouts.java
   1370 Jul 28 2004 DisplayTopWriters.java
   979 Jul 28 2004 FairtunesSearchURL.java
   239 Jul 28 2004 Makefile
   921 Jul 28 2004 Picture.java
   1319 Jul 28 2004 VendorList.java
   1601 Jul 28 2004 VendorSearchURL.java ./songsifter/java/com/transpose/tags/test:
   473 Jul 28 2004 testtopscorers.jsp ./songsifter/java/com/transpose/util:
   1531 May 20 2004 Assert.java
   5363 May 20 2004 BreadCrumbs.java
   1302 May 20 2004 CookieUtils.java
   722 May 20 2004 DBConfig.java
   3000 May 20 2004 DBConnectionHelper.java
   1624 May 20 2004 DBQueryHelper.java
   2009 May 20 2004 DBUpdateHelper.java
   2393 May 20 2004 DateUtils.java
   7010 May 20 2004 DocumentObject.java
   2134 May 20 2004 Dumper.java
   1267 May 20 2004 DynamicPagedList.java
   11297 May 20 2004 ElementObject.java
   4450 May 20 2004 ErrorNotifier.java
   4059 May 20 2004 HashUtilities.java
   2465 May 20 2004 ID.java
   321 May 20 2004 KeyNotFoundException.java
   5937 Sep 8 2004 KeyedStoreRecord.java
   555 May 20 2004 LoggedException.java
   1026 May 20 2004 Mailer.java
   247 May 20 2004 Makefile
   13714 May 20 2004 Normalize.java
   1448 May 20 2004 PagedList.java
   8154 May 20 2004 PreparedStatementHelper.java
   2519 May 20 2004 RSSDocument.java
   1017 May 20 2004 RSSEnclosure.java
   1844 May 20 2004 RSSItem.java
   2237 May 20 2004 RadioBlogger.java
   1069 May 20 2004 RandomString.java
   5422 May 20 2004 Rating.java
   6068 May 20 2004 ResultSetHelper.java
   982 May 20 2004 SQLFormat.java
   458 May 20 2004 Singleton.java
   3166 May 20 2004 SingletonStoreRecord.java
   3672 May 20 2004 SongHash.java
   23556 Sep 8 2004 StoreRecord.java
   656 May 20 2004 StringDumper.java
   5193 May 20 2004 StringFormat.java
   900 May 20 2004 TestURL.java
   3474 May 20 2004 TransactionConnection.java
   621 May 20 2004 WaitThread.java
   657 May 20 2004 XMLParsingException.java 1671 May 20 2004 XercesErrorHandler.java
6628 May 20 2004 XmlWriter.java ./songsifter/java/com/transpose/util/servlets:
248 May 20 2004 Makefile ./songsifter/.jsps:
4215 May 20 2004 about.jsp
4976 May 20 2004 aboutartists.jsp
2419 May 20 2004 aboutauctions.jsp
7213 May 20 2004 aboutcriteria.jsp
2982 May 20 2004 abouthosting.jsp
5330 May 20 2004 aboutnewmusic.jsp
3313 May 20 2004 aboutpoints.jsp
3747 May 20 2004 aboutpredict.jsp
2874 May 20 2004 aboutrecommend.jsp
4670 May 20 2004 aboutreviews.jsp
3798 May 20 2004 aboutsponsor.jsp
4074 May 20 2004 aboutthecompetition.jsp
930 May 20 2004 addtomailinglist.jsp
1082 May 20 2004 admin.jsp
2407 May 20 2004 allbuckssponsors.jsp
1515 May 20 2004 allpointssponsors.jsp
2407 May 20 2004 allsponsors.jsp
4960 May 20 2004 artistalreadyloggedin.jsp
2671 May 20 2004 artistlist.jsp
4073 May 20 2004 audiohelp.jsp
3893 May 20 2004 badge.jsp
448 May 20 2004 badge_bestrecs.jsp
3196 May 20 2004 badgedata_bestrecs.jsp
4303 May 20 2004 badges.jsp
895 May 20 2004 badgestyle.css
8285 May 20 2004 best.jsp
7323 May 20 2004 changed.jsp
4193 May 20 2004 changedbest.jsp
1717 May 20 2004 changegenres.jsp
9458 May 20 2004 confirmalbumbid.jsp
1947 Aug 6 2004 contact.jsp
1704 May 20 2004 copyright.jsp
8752 May 20 2004 create.jsp
6597 May 20 2004 createaccount.jsp
6632 May 20 2004 createartistaccount.jsp
10453 May 20 2004 createartistrec.jsp
3887 May 20 2004 createartistrecthanks.jsp
2765 May 20 2004 createbid.jsp
2294 May 20 2004 deedstats.jsp
8086 May 20 2004 discussion.jsp
8717 May 20 2004 edit.jsp
8738 May 20 2004 editartistrec.jsp
3741 May 20 2004 emailafriend.jsp
2375 May 20 2004 error.jsp
1309 May 20 2004 fanheader.jsp
3402 May 20 2004 fanlist.jsp
25449 May 20 2004 faq.jsp
2028 May 20 2004 friends.jsp
5880 May 20 2004 gettingstarted.jsp
3311 May 20 2004 help.jsp
501 May 20 2004 help_artistweeklyemail.jsp
543 May 20 2004 help_asterisks.jsp
416 May 20 2004 help_beta.jsp
416 May 20 2004 help_mailinglist.jsp
647 May 20 2004 help_musiclist.jsp
491 May 20 2004 help_mypoints.jsp
621 May 20 2004 help_myprivate.jsp
537 May 20 2004 help_mypublic.jsp
486 May 20 2004 help_mysite.jsp
576 May 20 2004 help_sponsoreddollars.jsp
592 May 20 2004 help_sponsoredpoints.jsp
535 May 20 2004 help_topscorers.jsp
670 May 20 2004 help_toratelist.jsp
317 May 20 2004 helppopupend.jsp
585 May 20 2004 helppopupheader.jsp
519 May 20 2004 helppopupstart.jsp
4622 May 20 2004 index.jsp
1564 May 20 2004 l.jsp
3116 May 20 2004 lastloginlist.jsp
2141 May 20 2004 lastmusiccomments.jsp
2175 May 20 2004 lastratingnotes.jsp
2186 May 20 2004 lastrecommendationcomments.jsp
6545 May 20 2004 login.jsp
304 May 20 2004 logout.jsp
3190 May 20 2004 mailpassword.jsp
6127 May 20 2004 memberprofile.jsp
7522 May 20 2004 music.jsp
9332 May 20 2004 musiccomments.jsp
9065 May 20 2004 musicdiscussion.jsp
5787 May 20 2004 mypoints.jsp
17942 May 20 2004 mysettings.jsp
12072 May 20 2004 needrating.jsp
2103 May 20 2004 newartistintro.jsp
4002 May 20 2004 newmusiclinks.jsp
4355 May 20 2004 newsletter-1-1.jsp
6165 May 20 2004 newsletter-1-2.jsp
116 May 20 2004 openLetter.jsp
552 May 20 2004 paypalfail.jsp
546 May 20 2004 paypalsuccess.jsp
23982 May 20 2004 positiverecommendation.jsp
7270 May 20 2004 preview.jsp
6849 May 20 2004 previewartistrec.jsp
2031 May 20 2004 privacy.jsp
3528 May 20 2004 quickstart.jsp
9052 May 20 2004 ratingnotes.jsp
8962 May 20 2004 recommendationcomments.jsp
88 May 20 2004 robots.txt
3058 May 20 2004 rssfeed.jsp
2727 May 20 2004 rssfeedsexplained.jsp
3598 May 20 2004 rulesforgoodreviews.jsp
7523 May 20 2004 searchresults.jsp
886 May 20 2004 showbadge.jsp
428 May 20 2004 siteoffline.jsp
9737 May 20 2004 spendmypoints.jsp
4335 May 20 2004 sponsorasong.jsp
3682 May 20 2004 sponsoredmusicbucks.jsp
3764 May 20 2004 sponsoredmusicpoints.jsp
4610 May 20 2004 sponsorwithbucks.jsp
6706 May 20 2004 sponsorwithpoints.jsp
2650 May 20 2004 startdiscussion.jsp
7417 May 20 2004 stats.jsp
789 May 20 2004 stresstesting.jsp
5667 May 20 2004 style.css
3201 May 20 2004 template.jsp
3280 May 20 2004 testvalidity.jsp
3537 May 20 2004 topmonthlyscorerslist.jsp
814 May 20 2004 topreviewwriters.jsp
3140 May 20 2004 topscorerslist.jsp
804 May 20 2004 topscouts.jsp
4260 May 20 2004 tos.jsp
5865 May 20 2004 updateemailsettings.jsp
8251 May 20 2004 updatememberprofile.jsp
5404 May 20 2004 updatepublicprofile.jsp
5836 May 20 2004 updatesitesettings.jsp
906 May 20 2004 values.jsp
2259 May 20 2004 verify.jsp
1408 May 20 2004 verify_failed.jsp
738 May 20 2004 verify_mailed.jsp 27188 May 20 2004 view.jsp
7399 May 20 2004 viewalbumauctionitem.jsp
3393 May 20 2004 viewdiscussion.jsp
3562 May 20 2004 viewforum.jsp
254 May 20 2004 viewreview.jsp
858 May 20 2004 waitforverify.jsp
65 May 20 2004 weblog.jsp
2255 May 20 2004 whyrate.jsp ./songsifter/.jsps/includes:
1107 May 20 2004 announcement.jsp
640 May 20 2004 autologin.jsp
440 May 20 2004 beginbody.jsp
229 May 20 2004 endbody.jsp
2523 May 20 2004 footer.jsp
9388 May 20 2004 header.jsp
3646 May 20 2004 jspheader.jsp
494 Sep 8 2004 notice.jsp
785 May 20 2004 retrievepoints.jsp
670 May 20 2004 setuppaging.jsp
2151 May 20 2004 sidebarauctions.jsp
442 May 20 2004 sidebarbadge.jsp
974 May 20 2004 sidebardiscuss.jsp
2228 May 20 2004 sidebarmailinglist.jsp
1945 May 20 2004 sidebarmypoints.jsp
3424 May 20 2004 sidebarsponsoredmusic.jsp
2458 May 20 2004 sidebartopdailyscorers.jsp
926 May 20 2004 sidebartopscorers.jsp
845 May 20 2004 songdeedlistheader.jsp

TECHNICAL FIELD

The present invention is in the fields of collaborative filtering and online community, typically as implemented on networks of communicating computers.

BACKGROUND ART

Collaborative filtering systems are well known, as are online community systems. Examples of the former include Amazon.com's recommendation technology and other similar systems such as eMusic.com's. Examples of the latter include Google Groups.

However, none of the existing solutions effectively leverages the fact that users of online recommendations systems and online community systems typically own their own computers, and have the opportunity to make the central processing units of those computers available for making such systems more useful and enjoyable.

In particular, the task of matching people with extremely similar tastes and interests becomes very computationally difficult as the number of people increases and as the complexity of the similarity measure increases. With hundreds of thousands or even millions of people such as are typically enrolled in major online services, limitations of server hardware resources constrain the system's ability to find the best matches between people based on taste and interest.

To the degree that such matches are made with real accuracy, "neighborhoods" of individuals with extremely similar interests may be formed that can be used for purposes of recommendation and community.

What is needed, then, is an effective way of leveraging the computers owned by end-users of a community and recommendation system for the purpose massively-distributed similarity searching.

SUMMARY OF THE INVENTION

The present invention puts the computer used by a particular end-user (the 'client computer' or 'client machine') to work in finding his or her best matches, thus offloading that computational load from the server. (In some variants, some users' computers may do that work for a manageable number of other users; for purposes of example this summary will not discuss those details.)

To enable the computations to occur in the client machines, the necessary data needs to be transported there. This data consists, at least in part, of 'profiles' of various users. Various embodiments do this in different ways, the common denominator being that profiles that are relatively likely to be matches to the user for whom neighbors are being sought arrive first.

Then the client computer conducts a substantially (or completely) exhaustive search of that available data for the very best matches.

Typically at least part of the profile data performs a dual purpose. First it is used for similarity calculations. Second, it is used for display purposes, so that a user can view taste information pertaining to his neighbors. For instance, in a typical music application, this will include song title and artist information for songs in the neighbors' collections.

This disclosure will make use of a detailed listing of key aspects, followed by a glossary containing definitions for terms used therein.

ASPECT 1. A networked computer system for supplying recommendations and taste-based community to a target user, comprising:

networked means for providing representations of nearest neighbor candidate taste profiles and associated user identifiers in an order such that said nearest neighbor candidate taste profiles tend to be at least as similar to a taste profile of the target user according to a predetermined similarity metric as are subsequently retrieved ones of said nearest neighbor candidate taste profiles, means to receive said representations of nearest neighbor candidate taste profiles and associated user identifiers on at least one neighbor-finding user node, said neighbor-finding user nodes each having at least one similarity metric calculator calculating said predetermined similarity metric, at least one selector residing on at least one of said neighbor-finding user nodes using the output of said at least one similarity metric calculator for building a list representing the nearest-neighbor users, said list representing said nearest-neighbor users providing access to associated ones of said candidate profiles, a nearest-neighbor based recommender which uses said associated ones of said candidate profiles to recommend items, a display for viewing identifiers of recommended items,
a display for viewing identifiers of a plurality of nearest neighbor users, means to select at least one of said nearest neighbor users from said display of identifiers of a plurality of nearest neighbor users, a display of information relating to at least one of the items in said nearest neighbor user's collection, whereby massively distributed processing is harnessed in a bandwidth-conserving way for finding the best neighbors out of the entire population of users, and the same neighborhood is leveraged to provide recommendations as well as highly focused taste-based community for sharing the enjoyment of items including recommended items ASPECT 2: The networked computer system of ASPECT 1, further including means to facilitate communication with at least said nearest neighbor users where the type of communication comprises at least one selected from the group consisting of online chat, email, online discussion boards, voice, and video.

ASPECT 3: A networked computer system for supplying recommendations and taste-based community to a target user, comprising an ordered plurality of nearest neighbor candidate taste profiles and associated user identifiers such that said nearest neighbor candidate taste profiles tend to be at least as similar to a taste profile of the target user according to a predetermined similarity metric as are subsequently positioned ones of said nearest neighbor candidate taste profiles, networked means to receive said nearest neighbor candidate taste profiles and associated user identifiers on at least one neighbor-finding user node, said neighbor-finding user nodes each having at least one similarity metric calculator calculating said predetermined similarity metric, at least one selector residing on at least one of said neighbor-finding user nodes using the output of said at least one similarity metric calculator for building a list representing the nearest-neighbor users, said list representing said nearest-neighbor users providing access to associated ones of said candidate profiles, a nearest-neighbor based recommender which uses said associated ones of said a nearest-neighbor based recommender which uses said associated ones of said candidate profiles to recommend items, a display for viewing identifiers of recommended items, a display for viewing identifiers of a plurality of nearest neighbor users, means to select at least one of said nearest neighbor users from said display of identifiers of a plurality of nearest neighbor users, a display of information relating to at least one of the items in said nearest neighbor user's collection, whereby massively distributed processing is harnessed in a bandwidth-conserving way for finding the best neighbors out of the entire population of users, and the same neighborhood is leveraged to provide recommendations as well as highly focused taste-based community for sharing the enjoyment of items including recommended items ASPECT 4: The networked computer system ASPECT 1, further including a single downloadable file that contains software that executes all necessary non-server computer instructions.

GLOSSARY

REPRESENTATION: In the above discussion of "aspects," representations may be the user profiles themselves (including the taste profiles), or just the taste profiles (which should include an identifier of the user)—or they may be user ID's of the users, or URL's enabling the data to be located on the network, or any other data that allows taste profiles and associated user ID's to be accessed. These are all functionally equivalent from the standpoint of the invention.

TASTE PROFILE: This term refers to data representing an individual's tastes or interests. It can take many forms. It may be the XML file generated by Apple's iTunes application which contains a list of music files in the user's collection as well as how many times he has played each one, and other related information. This is a fairly complete profile, having the disadvantage that it tends to consume a fairly large number of bytes that thus take significant bandwidth to download.

Other profile types include simple lists of song identifiers or album or artist identifiers, or various combinations thereof. In non-music domains, other examples include book ISBN's, or author names, or combinations thereof; or weblog URL's, or weblog posting identifiers, or combinations thereof; of any of a multitude of other representations of a user's tastes and/or interests.

Just as different profile types may contain various different types of data, there are many formats that can be used for representing such data to be processed by a computer. XML is one, but such specifications as CORBA and many others provide ways that data objects can be represented and transported across a network, and in general such formats as vectors or other binary or text-based formats can be used.

A taste profile is data that represents a user's tastes and/or interests. The format and contents are particular to particular embodiments, and it must not be construed that the present invention is limited in scope to particular contents or formats as long as the data comprises a user's tastes and/or interests or some useful summary thereof.

Further, it should be noted that a user may have a plurality of taste profiles. For instance, a user may have one type of music he likes to listen to while studying, and another type he likes to listen to while dancing. Preferred embodiments of the invention allow the user to choose different taste profiles—and correspondingly different nearest neighbors and recommendations—according to mood.

Still further, note that taste profiles may be either manually or passively generated. For instance the iTunes application captures user activity in the course of playing music, and stores it to its associated XML file. The user does not have to make any Sep arate effort to cause a taste profile to be generated based upon that data. On the other hand, taste profiles can be manually generated by manually supplying ratings to items such as songs, movies, or artists. A playlist—a list of songs a user likes to play together, and which has usually been generated manually—can be considered in some embodiments to be a taste profile. Some embodiments use taste profiles that incorporate a combination of passively and actively collected data. For instance, a profile may include manually-generated ratings of songs, as well as the number of times each song has been played.

Finally, note that taste profiles do not necessarily include data directly entered by the user; they can instead be a computer-derived representation. For instance, in embodiments which associate information such as genre or tempo for songs, software developers of ordinary skills will be able to see how to summarize data for songs the user has in has his collection to create a profile showing which genres or tempos the user likes most; that information may then comprise the user's taste profile. Or, in certain embodiments with numeric values for attributes, the log of the values may be used.

TARGET USER: The aspect discussion describes the invention in a way that focuses on serving a particular user, who we call the "target user." There are a plurality of users who could be considered to be target users, but for descriptive purposes we focus on one such user.

USER PROFILE: A user profile contains information related to the individual such as his name, contact information, and biographical text. It also contains his taste profile. An embodiment may make all, some, or none of this information publicly available.

SIMILARITY METRIC: Degrees of similarity are computed according to a similarity metric, which is not necessarily a "metric" in the formal sense of a "metric space" as that term is used in mathematical literature (for instance http://en.wikipedia.org/wiki/Metric_space). A very great variety of similarity metrics are available. There is necessarily a correspondence between the nature of the similarity metric and the taste profile, because similarity metrics often require particular types of data.

For instance, if ratings data is present where numerical values are given such as on a scale from 1 to 7 where 1 is poor and 7 is excellent, such simple methods can be used as computing average difference between the ratings of the items which have ratings in both taste profiles. Other techniques include computing a Euclidean distance, Mahalanobis distance, cosine similarity, or Pearson's r correlation using that data [13, 15]. Another approach is given in [16], beginning column 20, line 59. Any other computation that results in a metric that tends to be indicative of similarities of taste between the two users can be used.

In many embodiments data is massaged to make it more appropriate use with certain popular similarity metrics. For instance, in a music application when song play counts are included in the taste profile, the songs may be ranked in order of frequency of play; songs in the top seventh have an "implied rating" of 7, songs in the next seventh have an implied rating of 6, etc. This data can then be used with similarity metrics such as those mentioned above.

Note that some similarity metrics, such as Pearson's r, enable the computation of levels of probabilistic certainty, or p-values, with respect to a null hypothesis. In many cases, such as r, it is possible to state a null hypothesis that roughly corresponds to the concept "the two users have no particular tendency to agree." This enables the system to take into account the fact that some pairs of users have more data to base the metric on then others, and thus more reason to have confidence. This is a significant advantage over many of the simpler techniques. However, this approach nevertheless has a drawback. As an example consider two users with a very large number of items in common which they have each rated, where a p-value derived from r is used as the metric. Suppose further that on average, there is a slight tendency to agree rather than disagree. Then, simply due to the large number of items with ratings in common, the p-value may be extremely indicative of rejection of the null hypothesis, even though on average, there isn't a very unusual amount of agreement between ratings. In practical use with a large number of users, where not too many nearest neighbors need to be found, this effect is normally not a major problem, because there will also be users who do have a lot of agreement and who also have a high number of rated items in common, and such pairings will result in even greater extremities of p-values. In such cases, there can be a lot of confidence that the similarity metric is finding users who are actually very similar in taste—even though their may be other pairings, with even more similarity, that are left behind due to not having as much data for comparison.

The immediately preceding paragraphs focus on situations where degrees of agreement can be discerned for each item. Another type of profile involves presence/absence data—where all that is known about each item is whether a user is associated with it or not—for instance whether a user has a particular song in his collection or not. In such cases, such calculations as the well-known Jaccard's Index, Sorensen's Quotient of Similarity, or Mountford's Index of Similarity can be useful. Some embodiments combine different similarity metrics. For instance r can be used to compute a degree of similarity in ratings of items that are in common between two users, and Jaccard's Index to compute the degree of similarity implied by the numbers of items that are and are not in common between the users. An average or geometric mean (weighted or not) may be used to combine the metrics into one that incorporates both kinds of information; other techniques such as p-value combining with respect to a null hypothesis ([16]) can be sued as well, by converting the metrics into p-values.

Source code described in the file tasteprofileclass.py in Appendix 4 and included in the computer program listing appendix submitted on CD pursuant to 37 C.F.R.1.96 takes a different approach for computing similarity based on iTunes' XML file. Consider a "shared song" to be a song that is in the collection of both users. This method calculates an approximate probability that the next shared song to come into existence will be the next song played. That is, if user A takes a recommendation from B's collection, it will be a song that A doesn't have yet. When he has it, it will be another shared song. What is the probability that it will be the next song played, once it is in A's collection? This is a particularly appropriate similarity measure, because it measures similarity of tastes in a way that directly relates to a key purpose of finding nearest neighbors: making recommendations that the user will want to play frequently. Details of the algorithm appear in the source code. That algorithm is the currently preferred similarity metric.

The only requirement of the similarity metric is that, for a significant portion of pairs users which includes those who tend to be the most similar in taste, the following applies: if the calculated similarity of two taste profiles A and B is greater than the calculated similarity of two taste profiles A and C, then it is likelier than not that users A and B are actually more similar in relevant tastes than are users A and C. This likelihood will be greater for similarity metrics that will be associated with the highest-performing embodiments of the invention. For instance, simply using the average distance between ratings may be acceptable for some applications, but using Euclidean distance is better than a simple average.

There are many ways to calculate similarity. Other than the requirement above, the invention has no dependence on the particular similarity metric that may be chosen by a particular embodiment. The invention must not be construed to be limited to a particular similarity metric or type of similarity metric; the ones listed here are for reasons of example only. Similarity metrics are interchangeable for purposes of the invention.

MEANS FOR FACILITATING RETRIEVAL OF REPRESENTATIONS: There are a variety of ways to provide the functionality needed. It must be stressed that all provide identical or equivalent functionality for the purposes of the invention. While there are several basic structures available, there are many variants for each that are only insubstantially different and should not be construed as different in a way that would make them fall outside the scope of the invention.

What is needed is a means for facilitating retrieval of representations of nearest neighbor candidate taste profiles and associated user identifiers in an order such that said nearest neighbor candidate taste profiles tend to be at least as similar to a taste profile of the target user according to a predetermined similarity metric as are subsequently retrieved ones of said nearest neighbor candidate taste profiles.

The representations mentioned in the previous paragraph may be the user profiles themselves (including the taste profiles), or just the taste profiles (which should include an identifier of the user)—or they may be user ID's of the users, or URL's enabling the data to be located on the network, or any other data that allows taste profiles and associated user ID's to be accessed. These are all functionally equivalent from the standpoint of the invention.

It is important to note that the means for facilitating this retrieval does not need to make use of the predetermined similarity metric or a calculator that can calculate it. In particular, it isn't required that the retrieval of representations is exactly in the same order that would be given by the similarity metric.

One implication of this is that even if the similarity metric is not a metric in the sense of a metric space, a metric space-based metric can be used in the means for facilitating this retrieval. This makes available a large number of algorithms in the literature for facilitating the retrieval.

In preferred embodiments the data used in facilitating this retrieval is a subset of the data used in the similarity metric, or a summary derived from that data, or a combination of the two, in order to lower computational costs.

1) Pre-Existing Data Structures

Data structures may be created that provide the foundation for retrieval in the necessary order or sequence. For instance, clustering may be done using a variety of methods. See, for example, [1] and [2] which apply to "metric spaces," that is, a structure involving a distance function where the function used to compute the distance between any two objects satisfies the positivity, symmetry, and triangle inequality postulates. Such a distance function can be a similarity metric; examples include Euclidean distance.

See also [3] which works on large binary data sets where data points have high dimensionality and most of their coordinates are zero. For instance this can be used to cluster based upon attributes consisting of indicators of whether or not a user has a particular song in his collection. See also [4].

Appendix 4 describes source code (genrerankhandler.py), which appears on the computer program listing appendix, and which contains an algorithm which uses genre data (genrerankhandler.py), but a practitioner of ordinary skill in the art will see how to modify it for use with other kinds of data which is of limited dimensionality.

For a given clustering scheme, practitioners of ordinary skill in the art will know how to compare a particular taste profile to a particular cluster of taste profiles, and thus determine an affinity between each cluster and the taste profile.

Then, the cluster with the most computed affinity to the given taste profile is first in the retrieval order, the cluster with the next most computed affinity is the returned next, etc. Of course, there can be some degree of difference from this strict order without violating the spirit of the invention or moving outside its scope. When we discuss retrieving a cluster, we mean either a set of representations of nearest neighbor candidate user profiles, or a representation of such representations. For instance such a representation can be the name or Internet address of a file containing the representations of candidates.

Another approach which uses clustering is given in [5].

Clusters are not the only kind of structure that can be used. See, for example, [6] and [4]. Practitioners of ordinary skill will see how to use such structures for retrieving in an order consistent with the needs of the invention. Many such structures with different details of implementation, but these details are not substantial differences for the purposes of the invention. It is not possible to list all possible combinations of such details, and it must not be construed that one can move outside of the scope of the invention merely by finding such variations on the structures listed here, which it cannot be stressed enough are listed for reasons of example only.

The source code in Appendix A provides the exemplary key aspects of one particular method for causing the representations to be retrieved an order consistent with the needs of the invention. See the explanatory text in the section for clusterfitterclass.py.

Of course preferred embodiments update or replace these structures over time as taste profiles associated with users change, and users are added to or removed from the database associated with the embodiment.

Note further that the data structure may be built and stored on a central server, on machines owned by end-users of the invention which communicate their results directly to a server and/or to other end-user machines via peer-to-peer means, or on a combination. It must not be construed that a system falls outside of the scope of the invention merely because the necessary computational and storage resources for the foundation for retrieval are provided at one location or set of locations rather than another, or one type of network node rather than another.

As one example of a combined approach, consider [7]. That paper provides an algorithm to do clustering based on nearest neighbors. It can be leveraged to produce a combined approach as follows.

Use a peer-to-peer system such as the Gnutella protocol or any other protocol that enables one to search for a file. Each end-user machine is a node in such a network, also known as a "cloud."

Each end-user machine then conducts a search for each file, or a substantial subset, of files that are already in that machine's collection, using the words in the name of each file (or a substantial subset of them). A "hit" occurs when the protocol returns an identifier of a node that has a file with matching words in its name.

Some searches will get more "hits" than others.

For purposes of the algorithm in [7], "nearest neighbors" will have a different definition than the one involving the predetermined similarity metric of the present invention. It involves a couple of components.

The first component is "hit-nearness." Suppose a query returns only 1 hit. That means that the node identified by that hit is considered to be in the first tier of hit-nearness. If it returns 2 hits, each of the nodes are considered to be in the second tier of hit-nearness. And so on. The tiers are ranked, and the ranks are divided by the number of tiers. If T is the number of tiers, the best hit-nearness is $1/T$, the next best is $2/T$, and the worst is $T/T$ (1).

The next component is "quantity-nearness". We count the number of times a particular node's identifier is retrieved in the process of searching for files. We create tiers based on those numbers using the same tiered approach as for hit-nearness, and again resulting in a number between 0 and 1 where the worst node—the node with the smallest number of hits—has a quantity-nearness, Q, of 1.

Then the distance of a node to the node doing the search is the square root of $T*Q$. So the ordering of each node's the neighbors for the algorithm in [7] is laid out that way.

The work of finding neighbors for [7] is thus carried out on the end-user machines. Then, that nearest neighbor information is uploaded to the server from each node, and the algorithm in [7] is carried out there.

For instance, the algorithm could include Gnutella protocol code, and use the procedure described above to cluster similar taste profiles together, where similarity is determined by having more neighbors in common (rather than by our predetermined similarity metric).

Then to determine the order in which clusters should be downloaded to a particular user's node, the one that contains the greatest number of his neighbors should be downloaded first, then the one that has the next greatest number of his neighbors, etc.

2) Dynamic Searches for Neighbor Candidates

Instead of, or in combination with, pre-existing data structures such as described above, many embodiments use dynamic searches.

Probably the simplest example of this is a server-based system with a table of attributes culled from the taste profiles, one row per user. In one embodiment these attributes are bits representing the presence or absence of particular genres. So, if there are 100 defined genres, each row has 100 bits.

Then to determine the order in which taste profiles should be downloaded, the server simply checks each row and counts the proportion of matching genres to total genres in the other user's taste profile. The representations of taste profiles with the highest proportions are retrieved first. The table could be a RAM-based bitmap, a database such as based upon SQL, or any other convenient configuration. Of course they data used wouldn't have to be genres. It could be a selection of artists or songs or albums, or in non-music domains, book titles, web logs, paintings, news articles, school subjects, course numbers, etc.

In another set of embodiments, there is virtually no server-based processing at all; the only server processing is to supply network addresses for a set of seed nodes that may be online at the time, which may in fact be included with the download of the software that executes the computer steps involved in the invention.

In these embodiments, a peer-to-peer protocol such as Gnutella's is used to conduct searches for files, as described above in this text. Note that if a pre-existing, popular protocol such as Gnutella's is used it should be modified so that a node can respond to a request for a complete taste profile; if that does not include a list of all (or a substantial subset of) items on the node's machine, then nodes should also be able to respond to a request for such items.

As described elsewhere in this specification, a node (we will refer to it as the "target node") initiates searches for files it has in its collection. Nodes that are the subject of hits are candidate nearest neighbors. Nodes that have more files matching the target nodes files than others are statistically more likely to be hit before nodes with a smaller number of files. The representation that comes along with the hit is then used the taste profile and if necessary the list of files. So, that satisfies the requirement of the means for facilitating retrieval in the desired order. No other server activity is required.

Note that to increase the performance over protocols such as Gnutella that are popular at the current time, currently preferred embodiments use the peer-to-peer method described in [12]. Also, at the time that user machines connect for a new session in the peer to peer network, they should connect to randomly chosen seed nodes in order to increase the randomness of results obtained from searches.

It must not be construed that the scope of the present invention is limited to the particular techniques listed here.

3) Note on Retrieval Techniques

Whether the means for facilitating retrieval is based upon a pre-existing data structure or whether dynamic computations are done, there is still the question of actually delivering the representations of nearest neighbor candidate profiles, and if Sep arate, the profiles themselves.

In some embodiments these come directly from the server. In others such as peer-to-peer techniques like those described above, they may be the result of direct communication with the machine owned by the user whose profile is required.

In some embodiments caching solutions such as BitTorrent [8], FreeNet [9], FreeCache [10] and Coral [11] are used to distribute the representations and/or the profiles. It is preferred to use BitTorrent to distribute cluster files, where the clusters contain the profiles.

4) Further note on scope. It must not be construed that the scope of the invention is limited to the specific examples which are listed here for explanatory purposes. The requirement is that profile representation are retrieved s in an order such that the nearest neighbor candidate taste profiles tend to be at least as similar to a taste profile of the target user according to a predetermined similarity metric as are subsequently retrieved ones of said nearest neighbor candidate taste profiles. The intent is not to carry out the impossible task of listing every possible way to achieve that. The intent is to teach a number of ways to achieve that end; other techniques that achieve that end are equivalent for our purposes. That is, such techniques are interchangeable in the sense that they will result in an embodiment of the invention that falls within the scope.

NEAREST-NEIGHBOR: A target user profile's nearest neighbors are the other user profiles whose taste profiles are closest to the target user profiles according to the predetermined similarity metric. However in preferred embodiments there are exceptions: users can cause entries to be added to the nearest neighbor list that may not be ones that have the most computed similarity, and they may delete entries from the list, and they may cause an entry to become permanent (though manually deleteable). They can do these actions manually or through automatic means such as a program that runs through ones email address book and makes the user profiles associated with email address found there permanently. Such features may detract from recommendation accuracy while adding to the user's pleasure in the nearest neighbor community.

NEAREST-NEIGHBOR BASED RECOMMENDER: Nearest-neighbor-based recommendation algorithms are well-known in the literature. See for example, [13] and [14]. The source code file recommenderclass.py described Appendix 4 and included the computer program listing appendix also includes a technique.

The scope of the present invention should not be construed as limited to any particular nearest-neighbor-based recommendation algorithm. They are fundamentally interchangeable for the intents and purposes of the invention, although some will have better accuracy than others. The currently preferred technique is given in recommenderclass.py.

SERVER: The term "server" as used in this specification means one or more networked computers, incorporating a central processing unit and temporary storage such a RAM and also persistent storage such as hard disks. They perform central functions such as storing a central list of users. While there may be more than one server, they usually do not have to be Sep arately accessed by user-associated computers; rather they present a unified interface. One such example of multiple servers working together is the case of a server computer running software that interacts with client software running on user-associated computers, which uses other computers for database storage and to provide database redundancy.

USER NODE: The computer (also referred to as the "machine") associated with a human user of the computer, providing one or more input devices such as a keyboard and one or more output devices such as LCD screen. It is networked, preferably through the Internet, to other user nodes. A common protocol such as TCP/IP is used for communication with other user nodes.

NEIGHBOR-FINDING USER NODE: In currently preferred embodiments all nodes are essentially the same, and play the role of "neighbor-finding user nodes; but in some embodiments, certain tasks are relegated to certain of the user nodes. For instance, it may be that certain users are willing to make their computational and bandwidth resources available to others, and that others are less willing; for instance those who are willing may get a price break.

In such embodiments, neighbor-finding user nodes take it upon themselves to do work for multiple users. For purposes of neighbor-finding, they work either independently of the user nodes they are helping or in concert with them. For instance, they may receive the candidate nearest neighbors for other users, and use their taste profiles to compute the similarity according to the similarity metric, and then pass on only the most similar nearest neighbors to the user nodes across the network.

IDENTIFIERS FOR DISPLAY: Identifiers of items and nearest neighbors are displayed in such visual constructs on a visual computer display as tables in a window or menus such as pop-up menus. Some embodiments may use audio means as a kind of display when visual display is not possible. The identifiers may be identifiers used internally to keep track of the items and users, or they may be special public identifiers supplied by the users or item producers, or any other identifier that is thought would be convenient for the users.

Notes

While this specification focuses on the example of music recommendation and communities, that is for purposes of example and ease of explanation only. It applies just as completely to other domains, such as books, web logs, web sites, movies, news, educational items, discussion groups, and others. Embodiments in all of these domains and other domains which could benefit from taste-based recommendations and communities. Occasionally in this specification the word "item" is used inclusively to represent the various types of objects of taste or interest.

The word "taste" as used in this specification should not be construed to imply that the invention's scope is limited to artistic works. It applies equally well to information such as news sources. The word "interest" should be considered a synonym for "taste" for purposes of this specification.

Other information besides the taste profiles may be used in finding nearest neighbors. As one example, some embodiments allow the list of nearest neighbors to be restricted to individuals who live in particular physical localities.

The specification sometimes uses the word "machine" as an equivalent for "computer."

MODES FOR CARRYING OUT THE INVENTION

Figure 1:
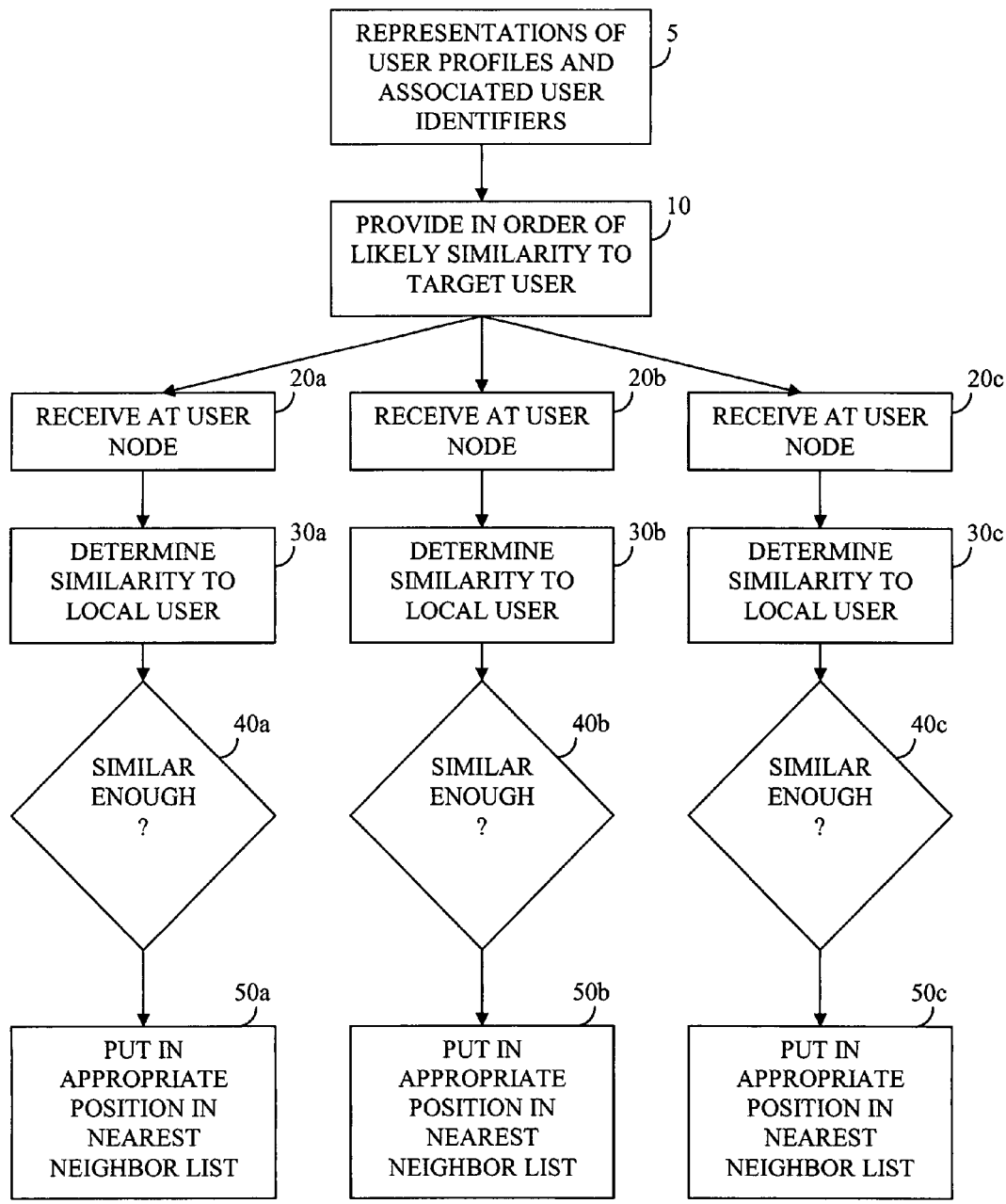
FIG. 1 is an overall flowchart illustrating an embodiment in which each client node is responsible for determining its own user's nearest neighbors.

FIG. 1 illustrates an embodiment in which each client node is responsible for determining its own user's nearest neighbors. Representations of user profiles and associated user identifiers 5 are provided in order of likely similarity to the user. See, for example, the descriptive text for clusterfitter.py in Appendix 4, which describes a way a client node can determine the order in which to download each one of a set of clusters. (The source code itself appears the computer program listing appendix.) In the preferred embodiment, these clusters are downloaded with the help of other client nodes using BitTorrent. In the preferred embodiment there are a limited number of clusters, retrieved by each client node in its own appropriate order. Not every cluster is retrieved by every client, because only a certain amount of time is available to do the downloads. But on the whole, each can generally, in time, be found on a number of client nodes. This enables a BitTorrent tracker running on the server, together with BitTorrent client software running on the clients, to work together to share the community bandwidth to download a cluster to a client that requests it. A programmer of ordinary skill in the art will readily see how to use BitTorrent client software, publicly available in open-source form (http://bittorrent.com/) to accomplish these tasks. Note that there is also an existing BitTorrent "trackerless" option that does not require a tracker on the server, but rather distributes the tracker functionality to the nodes, further diminishing the bandwidth load on the server.

This disclosure contains several additional sections, each designated as an Appendix, and together with the rest of the text and computer code presented herein, forming a unified disclosure of the present invention. As one alternative way of achieving the desired ordering of profiles see the distributed profile climbing technique described in Appendix 3.

The profiles are received at the user nodes 20$a$-$c$. The similarity of each one to the local user is calculated 30$a$-$c$. The ones that are similar enough 40$a$-$c$ to the current user (for instance, by being more similar than the least-similar current member of the nearest neighbor list) are put into the appropriate position 50$a$-$c$ in the nearest neighbor list. In preferred embodiments that position is consistent with an ordering by similarity.

Figure 2:
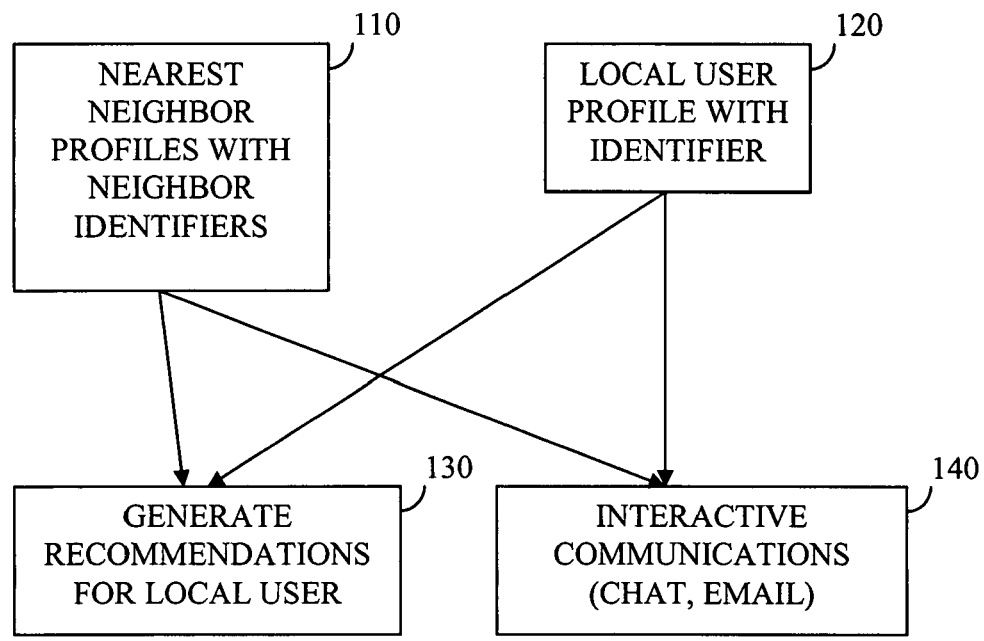
FIG. 2 is a chart showing how the nearest neighbor list 110 is put to use

In FIG. 2 the nearest neighbor list 110 is put to use. Combined with the local user profile 120, recommendations are generated 130 for the user (see, for example, recommenderclass.py, described in Appendix 4 and included on the computer program listing appendix for an example of how to accomplish that).

Interactive communications are also enabled 140. For instance, preferred embodiments display the user identifiers of nearest neighbors in a list on a computer display. An interaction means such as clicking on a particular icon enables an email to be automatically generated addressed to the neighbor and indicating that the sender is the current user; the user then fills in the message text and sends it.

BIBLIOGRAPHY

References listed below in this section are hereby incorporated by reference in their entireties to the fullest extent allowed by law.

[1] V. Ganti, R. Ramakrishnan, J. Gehrke, A. Powell, and J. French. Clustering large datasets in arbitrary metric spaces. Technical report, University of Wisconsin-Madison, 1998. http://citeseer.ist.psu.edu/ganti99clustering.html

[2] M. Ester, H.-P. Kriegel, J. Sander, M. Wimmer, and X. Xu. Incremental clustering for mining in a data warehousing environment. Proc. 24th Intl. Conf. on Very Large Data Bases (VLDB), 1998.

[3] C. Ordonez, E. Omiecinski, and Norberto Ezquerra. A fast algorithm to cluster high dimensional basket data. In IEEE ICDM Conference, 2001. http://citeseer.ist.psu.edu/ordonez01fast.html More

[4] Peter Yianilos, Data structures and algorithms for nearest neighbor search in general metric spaces. In Proceedings of the fourth annual ACM-SIAM Symposium on Discrete algorithm, Pages 311-321, Austin, Tex., United States, 1993.

[5] C. Li, E. Chang, H. Garcia-Molina, and G. Wiederhold. Clustering for approximate similarity search in high-dimensional spaces. IEEE Transactions on Knowledge and Data Engineering, 14(4):792-808, July-August 2002

[6] P. Ciaccia, M. Patella, F. Rabitti, and P. Zezula. Indexing metric spaces with mtree. In Quinto Convegno Nazionale Sistemi Evoluti per Basi di Dati, pages 67-86, Verona, Italy, 25-27 Jun. 1997.

[7] R. A. Jarvis and E. A. Patrick. Clustering using a similarity measure based on shared near neighbors. IEEE Transactions on Computers, C-22(11), pages 1025-1034, November 1973

[8] http://bittorrent.com/

[9] http://freenet.sourceforge.net/

[10] http://www.archive.org/web/freecache.php

[11] http://www.scs.cs.nyu.edu/coral/

[12] N. Sarshar, P. Boykin, V. Roychowdhury. Percolation Search in Power Law Networks: Making Unstructured Peer-to-Peer Networks Scalable. Fourth International Conference on Peer-to-Peer Computing, pages 2-9, August 2004

[13] U. Shardanand, Social Information Filtering for Music Recommendation. MIT Master's Degree Thesis, 1994.

[14] B Sarwar, F. Karypis, J. Konstan, J. Riedl. Recommender Systems for Large-scale E-Commerce: Scalable Neighborhood Formation Using Clustering. Proceedings of the Fifth International Conference on Computer and Information Technology (ICCIT 2002), 2002.

[15] U. Shardanand, and P. Maes. Social Information Filtering: Algorithms for Automating "Word of Mouth". in Proceedings of CHI'95 (Denver Colo., May 1995), ACM Press, 210-217.

[16] U.S. Pat. No. 5,884,282

APPENDIX 1

This appendix describes a number of variations which we consider to be part of the invention.

Some embodiments of the invention use "playlist sites" or "mp3 blogs" or "music blogs" to supply profile information, rather than, or in addition to, profile information stored on a local disk such as the XML database generated by Apple's iTunes product. In typical embodiments this information is collected by a "screen scraping" procedure, either by a process or processes running on the server system, or on user nodes. In some cases, such sites publish song information using OPML or other XML formats such as RSS, which reduces or eliminates the need for screen scraping. For embodiments making use of this capability, profile information will be provided to users of the system that may represent the tastes of other individuals who are not users of the system. To a large degree, the data associated with these individuals is treated identically to the data associated with users. In some aspects it will normally not be possible to treat them identically because less data will be available for them. The adjustments that need to be made in such cases will be readily apparent to the software developers. Note that since this specification focuses primarily on users of the system, there will be cases where the term "user" should be considered to also include "ghost users" derived from external data representing non-users.

Another source of ghost user data is services such as audio-scrobbler that make identifiers of songs currently being played by a given user available on the Web. One of ordinary skill in the art will immediately see how to monitor such a service to build up a profile, over time, of users whose currently-played-song is displayed.

Some embodiments provide a facility whereby simply loading a web page (and optionally giving permission for security reasons) will cause software to be automatically loaded into the user's machine that provides the necessary functionality; this avoids the Sep arate step of downloading and installing application software. This can be accomplished, for instance, by means of Java-language code called by a Web browser.

Preferred embodiments have a "permanent neighbors" feature, as well as a "machine-generated neighbors list" feature. The machine-generated neighbors list displays identifiers for those users that have been determined to be very close matches in taste or interest to the current user. The permanent neighbors list displays identifiers for users that have been selected by the current user.

In preferred embodiments, user-interface techniques are provided for turning machine-generated neighbors into permanent neighbors. Typically this is done by a drag features where a member of the displayed list of machine-generated users is dragged to the displayed list of permanent neighbors. Other techniques include allowing the user to select member of the displayed list of machine-generated users and call a menu option to cause it to be listed as a permanent neighbor; this can be a pop-up menu, a contextual menu, or a standard menu.

Permanent neighbors may be manually removed from the permanent neighbors list by the user; for instance, by means of a menu choice or drag operation. Another option is a checkbox where multiple permanent neighbors can be marked for removal, accompanied by a Sep arate button to cause the removals to happen.

In preferred embodiments, UI elements are provided to enter an email or IM address for an individual, and cause him to be emailed such that the said email includes a link (or other technique) for enabling easy download of client software implementing the invention. In further embodiments, the other user is automatically added to the permanent neighbors list when the other individual becomes a registered user of the system. This may be accomplished in many ways, readily discernable to one skilled in the art; the scope of the invention should not be construed as being limited to the examples listed in this paragraph; they are listed for reasons of example only. For instance, as the user profiles arrive on the client machines for determining which are nearest neighbors, they can be checked to determine whether an emailed individual is among them. (The addresses of emailed users would be stored on the local user's machine for this purpose.) Alternatively, the client can periodically query a database table residing on the server, to check whether the emailed user has become a registered user.

In preferred embodiments, permanent neighbors can include ghost users, where the ghost users are identified by the local user by appropriate network identifiers. For instance in the case of online playlists, a URL that identifies the playlist of the particular individual would be one appropriate type of identifier. In further embodiments, the data for such neighbors is retrieved directly (across the network) by the client node without interaction with the server that implements the server portion of the invention.

In preferred embodiments, users may click on the identifier for a permanent neighbor and cause information to be displayed that represents the user's musical tastes; such as a list of artists and/or songs in the user's collection, possibly including such elements as the number of times each song has been played, the date added to the collection, and others; this list is for example only and not intended to be inclusive. Further embodiments display this data for permanent users in the same onscreen list area that is also used for displaying the analogous data associated with machine generated neighbors.

In preferred embodiments where neighbors are used as the basis for generating recommendations, it is recognized that permanent neighbors may or may not be the ideal individuals to generate recommendations from. For instance, an individual may be made into a permanent neighbor because he is a friend, rather than because his tastes are remarkably similar to those of the local user. Accordingly, in such preferred embodiments the option is provided to leave permanent neighbors out of the recommendation process. In some such embodiments, this is done as a single binary choice for all permanent neighbors, for instance, using a checkbox that appears in a Preferences dialog. In others, it is done on a one-by-one basis, for instance, with checkboxes accompanying each listed, displayed identifier for permanent neighbors in the user interface. In some embodiments, it is possible to make a single binary choice to indicate that only permanent neighbors are used for recommendations; in others there is a screen widget such as a collection of 3 radio buttons or a standard menu which "sticky" indicators of a previously made selection, where the user can choose between not using permanent neighbors in the recommendations processing, only using permanent neighbors, or using both.

Preferred embodiments display the most recent date and/or time that each permanent or machine-generated neighbor last used the system, to the extent that the client may be easily aware of that information. For instance, it may be included in profile information that arrives at the local user's node for processing of candidate neighbors; in which case it may not be the most recent data available to the system as a whole. Alternatively it is retrieved directly from the server when it is to be displayed, and is thus up to date.

Preferred embodiments contain on-screen lists of neighbors (which may include permanent neighbors or where permanent neighbors may be in Sep arate, similar lists); in further preferred embodiments these lists contain screen elements of the presence or absence of email addresses for the users (needed because, in preferred embodiments, it is optional to supply an email address and/or to allow other people, preferably including other users, to be made aware of them). In further embodiments, clicking on such an element causes an email application opened and an automatically-addressed email to be generated, to be populated with content by the user. Similarly, elements indicating an IM address, or other communications handles, may be displayed, and UI functionality provided to facilitate such communications. In some such embodiments one element is provided for each neighbor to indicate one or more than one modes of communication as available, and clicking it causes a menu to appear that lists them; choosing one facilitates communication by the chosen mode. In other embodiments, the user selects the list row containing the user identifier, and brings up a standard menu to choose a mode to communicate with the selected user; when communication handles are not provided for a particular mode, that one is greyed-out. A software developer of ordinary skill will readily see other variations of how to facilitate user interaction regarding what modes are available and how to facilitate engaging each one. Such variants which contain some on-screen indicator of the availability of communications with a given user are within the scope of the invention. Software developers of ordinary skill in the art will immediately see how to implement this.

In preferred embodiments certain individuals are registered as being artists. When an item such as a song by such an individual is displayed on screen, and if the artist has indicated that he wishes communications with him to be enabled, an indicator of that is provided, and UI techniques for facilitating such communications are provided; these techniques will generally be similar to those already discussed for user-to-user communication. Software developers of ordinary skill in the art will immediately see how to implement this.

When artists communicate with users, preferred embodiments monitor the uniqueness of the communications, in an attempt to determine whether artists are really communicating one-to-one with users. One way to determine this would be to randomly sample a number of pairs of communications from artists, and use "diff" text comparison techniques to compare them. Artists with low average number of differences are considered by the system to not be truly engaging in one-to-one communications. Other techniques that enable some measure of general uniqueness to be determined also fall with in the scope; the invention is not dependent on any particular technique for that functionality. In various further embodiments, there are ramifications of being considered to not engage in true one-to-one communications; for instance, in some embodiments, such artists are banned from being presented to users as potential targets of communication; in others there is a displayed list of artists who appear to tend to use "canned" responses; in others that individual is not enabled to initiate communications with non-artist users. In preferred versions of such embodiments an artist can denote a particular communication as being an announcement, and it would then be excluded from the described uniqueness checking.

Some embodiments provide UI functionality that allow the user to specify a genre or artist or other criteria for determining a subset of items, and then causing item recommendations to be selected from that subset.

Some embodiments enable recommendations to have their order at least partly determined by the similarity of the item to the items associated with some specified artist(s), item(s), or other grouping of items (such as an album of songs).

Some embodiments provide professional-interest-matching or dating services by examining files on the user's local computer, for instance words in documents, and possibly words in linked URL's where the links themselves are stored on the user's computer, to build interest profiles; neighbors and, in preferred such embodiments, item recommendations, are based on this data.

Some embodiments use a bar-code reader or other automatic means for identifying physical objects in order to generate, or as a contribution to, the data in the user's taste profile. For instance, music CD cases typically have bar codes that can be used for that purpose. (Note that a software product for the Mac OS X operating system, called Delicious Library, has the ability to take data supplied by a bar code reader to build a digital library of physical CD's and other items; however it has none of the other features described in this invention.)

Some embodiments add a gift suggestion feature. The individual for whom gift recommendations are to be made available makes his relevant data available to the machine associated with the user who wants to give a gift. For instance, an once such embodiment, an iTunes user might email his iTunes Music Library.xml file to the user who wants to give him a gift. Other techniques for getting the relevant information to the local user are equivalent from the standpoint of the invention. Then local processing occurs for that other user's data that is basically the same as for the local user's own data. For instance, in embodiments involving recommendations by means of neighbors, a collection of machine-generated neighbors is found relative to the gift recipient's data, and recommendations are generated from that and displayed on the screen. The value of this is that the local user already has the code necessary for such functionality, for his own recommendations; and in this case much of that same code is re-used for purposes of gift suggestions.

Some embodiments interact with an online music store in such a way that highly recommended music is automatically purchased at regular intervals of time. For example, on a monthly basis, an embodiment that works with the iTunes music store could cause the most recommended n songs where n is 1 or some greater number to be automatically purchased and downloaded to the user's machine. In preferred embodiments, the user is alerted before this occurs and given the choice to modify the list of songs to be purchased; for instance, the application software might display an alert dialog, the day before the purchase is to be made, which indicates that the top 10 songs will be purchased; input means such as checkboxes next to the listed songs may be used to indicate that certain songs should excluded from the automatic purchasing. Preferred embodiments allow the user to choose the periodicity and number of songs to be automatically purchased. In some embodiments, this process is used to cause the creation of a physical CD by a store, containing recommended music (or, in other embodiments, videos, books, etc), which is subsequently shipped to the user.

Preferred embodiments give the user control over which artists are considered to be part of the user's effective taste profile. For instance, in one embodiment the local user can view a list of the artists in his music collection; there is a checkbox next to each one, defaulting to checked; if it's unchecked, that artist is effectively ignored in other processing based on the taste profile. In the embodiment in question, this is accomplished by means of a tuned taste profile and untuned taste profile; the only real use of the untuned one is to present that list to the user for tuning by unchecking checkboxes. So, in embodiments providing control over the artists that are considered to be effectively part of the taste profile, where the user's local taste profile is used for finding nearest neighbors, only the desired artists are used; and where taste profiles are part of the data broadcast by the system to be viewed by other users and/or for other users to choose neighbors, only the desired artists are used. In some embodiments different sets of artists may be chosen for finding neighbors of the local user and for broadcasting, but preferred embodiments combine those features. A software developer of ordinary skill in the art will immediately see other ways of handling the user interface and technical issues for achieving the same purposes; these are equivalent from the standpoint of the invention.

One embodiment involves online chat. An interest profile is built based upon a) the words the local user types into his chat client and/or b) the words that appear in messages types by other people into the same chat room. In the case of (b) a subset may be used where the only messages that are at least somewhat likely to be responses to messages from the local user are used—for instance by distance in time from the time of a message sent by the current user to the chat room where the potential response appeared. By collecting these words over time (and in some embodiments, giving words posted by other individuals less weight), a profile of chat interests can be built for each user. Then, when the system builds neighborhoods of similar users, those neighborhoods can be viewed as potential chat partners. In preferred embodiments a user clicks on a user identifier to start a chat session with them. In some embodiments chat rooms are automatically initiated for groups of similar users. In chat embodiments, no other recommendations are necessary. Note that variants of this set of embodiments use different techniques to match people together according to the words they type. The simplest way is to simply treat the words used by a user as a document; then techniques for document similarity which take word frequency into account can be used. (A search on Google for "document similarity" will bring up numerous techniques.) But any technique that calculates useful similarities based on the word content is equivalent for purposes of the invention.

Some embodiments provide means to restrict candidate neighbors by certain criteria such as physical locality. One way to do this is to simply assign the lowest possible similarity to people who don't meet the restriction requirements; another is to exclude them at the outset from the neighbor-searching process. Techniques to do this will be immediately apparent to a software developer of ordinary skill.

One advantage of having software running in user nodes is that certain parameters for recommendation quality can be tuned on the user node, for the given user, by computationally expensive techniques such as genetic algorithms. Some embodiments take advantage of this fact by using iterative testing, genetic algorithms, simulated annealing, or other optimization techniques to tune parameters such as the following: the number of neighbors to use in recommendation calculations (assuming only the must similar neighbors are chosen), the optimal adventurousness (see elsewhere in the specification for discussion of adventurousness), a cutoff release date for recommended items (for instance, the user may not be interested in old music), and others. One such other is a number representing the lowest weight to be associated with any user's information; the least similar of the nearest neighbors is assigned this weight and interpolation, with a max of 1 for the single nearest neighbor, is used to assign weights to the other neighbors according their rank or another measure. The optimization may be based on tuning the parameters to get the best match between recommended music and the music actually already in the user's collection. (Obviously under normal processing, preferred embodiments do not recommend music that the user already has, and this screening is disabled for optimization purposes.) Preferred embodiments in the music domain try to optimize the match between ranks based on song plays per day and order of recommendation. For instance, Spearman's Rank Correlation can be used to do this. Some tuning operations may change the number of recommended songs; to find the optimal setting it may be useful to compute the p-value associated with each pair of rankings; the more statistically significant the p-value, the better. When rank correlation is used, preferred embodiments only consider the ranks of the top recommendations, because we are less interested in the exact rank of songs that are not particularly recommended. At an extreme of this general approach, some embodiments uses Koza's Genetic Programming technique to generate at least part of the algorithm used in the recommendation process, using similar fitness criteria to the optimization measures mentioned already in this paragraph.

In embodiments which carry out evolutionary computation like genetic programming, the invention has useful ramifications for multiprocessing. For instance a each user node evolves chromosomes (such as hierarchical programs in a genetic programming environment) which best suit the needs of the local user. It is likely that those same chromosomes will be relatively high-performing for other users who have the local user among their neighbors. So in preferred evolutionary computation embodiments, one or more of the highest-performing genomes that has resulted from the evolutionary process on a user node becomes part of the profile, which also includes the taste profile. Then other user nodes that select a particular user as a neighbor will also have his highest-performing genome(s) available. These can be used directly; combined with those supplied by other neighbors by (for example) averaging the recommendation strength for each song across all genomes, or seeded into the evolving population of genomes on that node; this is a form of multiprocessing evolutionary computation. It should not be construed that the invention is limited to the example of multiprocessing evolutionary processing described here; it is an example only. For instance literature on genetic programming is rich with research on ways to do genetic processing in a multiprocessor environment. Those skilled in the art of genetic programming will see numerous ways to leverage the fact that each user has a neighborhood of users who will tend to be well-served by many of the same genomes, and have user nodes that are available for multiprocessing to better serve the needs of all such users. For instance, without restricting genomes that are fed from other users into a local user's genome population to just the set of nearest neighbors, some embodiments give more or less probability to a foreign genome being added commensurate with the other user's similarity to the local user. Many variants of taking advantage of the similarity information and the overall structure of the invention will occur to those of ordinary skill in the art of genetic programming, and it must not be construed that such variants are not within the scope of the invention; that is, variants are within the scope if they result in better performance due to the following attributes of the invention: a) the fact that the mechanism that transports taste profiles from user node to user node (which may involve using the server as an intermediate step) can also be used to transport genomes, either as a Sep arate data package or as part of the same data package, and b) that mechanism is set up so that profiles with a higher similarity to the local user have a higher probability of arriving sooner (and, in some embodiments, at all), and those genomes are more likely than randomly-chosen ones to have higher fitness for the local user.

In preferred embodiments, direct peer-to-peer communication of individual taste profile information occurs between neighbors. This can enable faster updating of neighbor taste profile data than would occur through the usual mechanism described in this specification. Further embodiments provide an output mechanism for showing identifiers of the digital item currently being experienced by other neighbors; in some such embodiments that information is also used to update the neighbors' taste profiles stored on the local node while waiting for full updated taste profiles to arrive through the usual mechanisms. In preferred embodiments which make use of peer-to-peer techniques as described in this paragraph, the fact that some nodes may be behind firewalls that prohibit incoming connections from being made are handled by sending the necessary data through other nodes that do have the necessary ports open. Any software developer of ordinary skill in the art of peer-to-peer network programming will immediately see how to create the necessary peer-to-peer mechanisms for the functionality described in this paragraph; it should not be construed that only particular implementation mechanism are within the scope of the invention.

In preferred embodiments, users can create different taste profiles for themselves which fit different moods or interests. Most or all of the overall mechanism described in this specification then applies to each Sep arate taste profile. Neighbors are found and recommendations are generated for each one. For instance, playlists generated in Apple's iTunes program can comprise music taste profiles.

In some embodiments at least some users run a special version of software that implements the invention, in which not all the usual user interface features are necessarily present. In these embodiments, certain musical tracks are indicated as being free of charge—for instance, in the names of the files, or in a database. The user is recommended a collection of free songs. Identifiers for the songs are then uploaded to server system (not necessarily the same one as for other functions). Then the free songs are copied into a portable music player from a computer that is networked to the that server. Then the portable music player is packed and shipped to the user. Facilities are provided where there is a web site where the user orders and pays for the player, and is informed about how to get the software that will make the recommendations. In preferred embodiments a list of recommended free songs is presented to the user and the user can choose which ones he wants; identifiers of the chosen songs are sent to the server. Networking software and online store developers of ordinary skill will immediately see numerous ways to implement the required functionality; various implementations are equivalent from the standpoint of the invention; the scope of the invention is therefore not limited to certain implementation techniques. Note that this functionality may be removed from other aspects of the present invention; recommendations may be wholly made on the server based on data that is input, via the Web, to the server, using any recommendation methodology; the recommended songs are then loaded onto a portable players and shipped as described.

Some embodiments which involve artists having special accounts enable chat rooms for each artist, and provided indicators in the UI associated with artist names (such as next to the artist names in a list of artists) that show whether they are in the chat room or not, and means are provided for the user to click or otherwise interact with an onscreen control to cause them to "enter" the artist's chat room and chat with the artist. Practitioners of ordinary skill in the relevant programming techniques will immediately see numerous ways to implement this and these are equivalent from the standpoint of the invention.

In some embodiments special taste profiles are created that are structured like user taste profiles, but actually are taste profiles for an item. For instance in an embodiment which calculates user similarity based on the musical artists they have in common in their libraries, taste profiles are manually created for certain songs (such as songs that are sponsored by commercial interests) that mimic user taste profiles in the sense that each one contains a list of artist. Then the same similarity-calculating code can be used to find the songs that are most similar to the current user, and these may appear in a special recommendation list or mixed in with other recommendations Glossary for Appendix 1

User Nodes—machines that are on the network that also directly interact with users; typically these are machines owned by users or associated with them at their work locations.

Screen scraping—a software process that reads an HTML (or other) page on the World Wide Web (or other network system) that is intended for human use, and extracts useful data from it for machine use.

Ghost user—data representing an individual that is derived from an external source such as a music blog. In many ways, ghost users may be treated identically to regular users of the system.

Current user, Target user, Local user—these terms represent the user who is running software which implements a client portion of the invention; typically he or she is the one that is recommendations and one or more lists of neighbors are associated with in the course of examples in this specification.

IM—instant message, typically associated with chat software.

Neighbor—may be used to indicate machine-generated neighbors and/or permanent neighbors. Note that different embodiments may use different terminology for these.

Nearest neighbors—the set of neighbors who are most similar in taste to the local user; normally the same as machine-generated neighbors; though it is not impossible that a user will manually find a neighbor that is actually more similar in taste than the machine-generated ones, and add him to permanent neighbors.

Artist—a creator of items of interest to the subject domain or one of the subject domains of an embodiment of the invention. We use the term for shorthand, and, for example, in some domains such as academic papers, it could refer to an academic who wrote or co-wrote such a paper.

UI—user interface. In most cases, the user interface will involve a computer with a CRT or flat-panel screen and a keyboard, displaying a windowing system such as Microsoft Windows or Mac OS X. Such systems normally provide standard means to create menus, lists (or tables), checkboxes, etc. In other cases the UI may be audio with input by means of telephone touch-tones. The requirement is that it provides functionality that facilitates human-computer interaction.

Item—an item is the basic unit of content, such as a song

Interest profile or taste profile—data which is indicative of the interests or tastes of a user. Often used interchangeably in this specification. For instance, digital music user will normally have identifiers of the songs he likes (or that are in his collection) in his taste profile.

Server—a server is a central computer, or networked group of central computers that handle certain tasks for the benefit of the client nodes, such as storing a database containing login ID's, passwords, and profiles.

APPENDIX 2

This appendix describes another description of key functionality of the invention, including but not limited to facilitating retrieval of representations of nearest neighbor candidate taste profiles and associated user identifiers in an order such that said nearest neighbor candidate taste profiles tend to be at least as similar to a taste profile of the target user according to a predetermined similarity metric as are subsequently retrieved ones of said nearest neighbor candidate taste profiles.

This description is from U.S. provisional patent application 60/540,041, filed Jan. 27, 2004.

The specification describes a product named Goombah. However, the focus on Goombah is for clarity and descriptive purposes only and it must not be construed that the scope of the invention is limited to that particular embodiment or to the field that Goombah operates on (music).

Goombah's first purpose is to build a list of "nearest neighbors" for each user. They then form a community of like-minded people for communication purposes, and they also form a source for recommendations of items—if you have extremely similar tastes to me and you have an album I don't have and you play it all the time, I should probably give it a try. So that's the basis of the recommendations.

To find nearest neighbors exactly correctly is an $O(N^2)$ problem if simple technology is used, and we hope to have hundreds of thousands or millions of users whose profiles are constantly being updated, so we wanted to do better than $O(N^2)$.

There are probabilistic nearest neighbor algorithms that reduce this complexity hugely, but at a loss in reliability in finding the true nearest neighbors. We wanted to do better.

The key idea behind Goombah, whose purpose is to solve the above problem, is that the computations for finding the local user's nearest neighbors are carried out on that user's machine. So, if we have a million users, we have a million CPU's doing the work of finding nearest neighbors.

There are three reasons why such an approach is within now the realm of feasibility, where it wasn't a few years ago:

1) Most people who are heavy users of digital music have high-speed Internet connections, otherwise it would be unpleasant to do downloads from the likes of Apple's iTunes Music Store.

2) New technologies such as BitTorrent has emerged recently which offload bandwidth concerns for sending large files from a central server to the user nodes. In particular, the following is true for BitTorrent: The central server has a copy of the file that people need, but once one user has it on his machine, he is automatically set up as a server as well, and so on for every other user. Transfers are carried out from other users invisibly. (This is different from something like napster where you have to choose another user and request a download. Instead, the central server knows where all the copies of the files are, and tells a node that needs a copy the addresses of several machines to simultaneously get different chunks of the file from until the whole file is build. If a sending node drops out, other nodes automatically take its place, and so the file is eventually downloaded from multiple changing sources in a completely automated way.) This means it is possible for a company like Transpose to make very large files available to very large numbers of users without having hugely expensive server and bandwidth needs. Furthermore, it happens that BitTorrent is open source with a very friendly license and written in the same language (Python) that Goombah is written in.

3) Any serious digital music user already has a hard drive with gigabytes of space devoted to music, so spending a 100 megs or more on the data associated with an application like Goombah is no big deal. In the future, videos will commonly be stored on user hard drives, so that is another application for Goombah as it evolves.

So, essentially the idea, when a local user wants to find his nearest neighbors, is to download the profiles of all other users who could reasonably be considered to be candidates to be nearest neighbors of that local user. Then, the local user's Goombah application does a search of all those profiles to find the best matches.

Instead of downloading individual profiles, Goombah will download a single very large file—10's or even 100's of megs—that contain the candidate profiles. This will happen by means of BitTorrent.

These large files will be formed by a clustering algorithm.

We will find clusters of similar users which are large enough to contain most reasonable nearest-neighbor candidates for each general type of musical taste. They will be large enough to fill that need, and small enough to download in a reasonable time on a high-speed connection and not take a problematic amount of space on the user's hard drive.

So, the local user will download a large BitTorrent file containing all nearest neighbor candidates and do an exhaustive search on his machine for nearest neighbors.

Then he can communicate with his taste-mates and get automated music recommendations from them.

The large file will be updated on a regular basis with further BitTorrent downloads. The clustering algorithm can be any clustering algorithm that is capable of clustering a large number of users according to their degree of interest in a large number of subject items. (Where the degree of interest may be indicated by real-valued, binary, integer or any other that can represent a degree of interest.)

As one example, the commonly-used C4.5 algorithm can do this. For example, the open-source Java software WEKA has a module, weka.classifiers.trees.j48, which implements C4.5. In the context of using this module in a music setting, each user is an "Instance" and the song identifiers, such as strings containing the artist name, album name (if any), and song title, are used as the values of a "nominal attribute" representing the songs.

Miscellaneous Notes for Appendix 2

The step of using the local CPU to find nearest neighbors can be conducted in various ways. Any sub-algorithm which accomplishes the function "find nearest neighbors out of the downloaded large file" is considered equivalent for the purposes of the present invention. Possible ways to do it include an exhaustive search for the other users that are most similar to the local user according to some similarity metric. (The attached Python scripts, recommenderclass.py and tasteprofileclass.py contain code for generating a similarity metric. However it must be stressed that there are innumerable ways of generating a similarity metric for nearest-neighbor purposes, and they are all functionally equivalent from the standpoint of the present invention and all fall within the scope of the present invention. We can use any metric that results in reasonable likelihood that two users that are considered more "similar" than another pair of users actually have more shared interests in the targeted interest-domain [such as music] than another pair of users with lesser similarity. Note further that we aren't using the word "metric" in its most rigorous sense, but in its general sense as a quantity used for measurement and comparisons.)

Another way to find the nearest neighbors from the downloaded large file is to use the vp-tree technique introduced by Peter N. Yianilos in his paper "Data Structures and Algorithms for Nearest Neighbor Search in General Metric Spaces". The large file to be downloaded would be formatted as a vp-tree and thus very fast nearest-neighbor searches would be facilitated on the local machine. Again, any technique used to find the nearest neighbors is functionally equivalent from the standpoint of the invention and falls within the scope of the invention.

The step of using peer-to-peer techniques for downloading the large files can also occur in various ways which are functionally equivalent from the point of view if the current invention. In fact, the invention does not depend on any particular technique for getting files from peers and all such techniques should therefore be considered functionally equivalent from the point of view of the invention. For instance, while BitTorrent provides a particularly compelling model for how this may be accomplished, the Gnutella provides an alternative model.

A difference between the BitTorrent and Gnutella approaches is that with BitTorrent, each file has a distinct URL which is understandable by a server machine which runs BitTorrent "tracker" software. By means of this URL, client software is told by the tracker which peers store the file (or parts of the file) so that the client can cause downloads to be started from a subset (or all) of those peers. With the Gnutella approach, there is no central server, and the local computer sends queries into the "cloud" of known peers and machines known to those peers, looking for files with particular filenames. Then, normally, one of those peers is chosen to be the source of the download.

The commonality between all these various techniques is that the large files each represent a group of similar profiles (or, alternatively, all available profiles), there are a fixed set of such files at any point in time, and the user causes one (or more) to be downloaded that is (are) particularly likely to contain worthy nearest neighbor candidates; these files are usually downloaded from one or more peers rather than from a central server. All techniques which satisfy these requirements are functionally equivalent from the perspective of the present invention and thus fall within the scope.

One key step is determining which large file a particular client should download in order to meet the needs of its user. Of course, in embodiments where all the profiles are in one large cluster, there is no issue. When they are divided into clusters, and each cluster is represented by a particular large file, however, this step needs to be carried out.

One way to accomplish this step is as follows:

When a system is first set up to embody this invention, it will usually only have a relatively small number of users on Day 1. Thus, there is no need to divide the population into Separate clusters for downloading. As the user population grows in size, a single file is used for download purposes.

Finally a point may arrive at which it is deemed, due to the relative of expense of bandwidth and diskspace, that the user population should be divided into two clusters. At that time, a clustering algorithm is run and the user population is divided into two clusters. Each of the two clusters is given a name: for instance, "U0" and U1".

Now, as time goes on, we do not regenerate those clusters from scratch. Rather, as new users are added to the system, they are added to the most appropriate cluster. This may be done in any number of ways. A centroid for the cluster may be calculated, and the new user added to the cluster whose centroid it is most similar to. Or the average similarity between the user and each cluster member may be calculated for each candidate cluster, and the most appropriate cluster chosen on that basis. Or, the change in entropy that would arise in the system as a whole due to each possible choice of cluster can be calculated, and the choice taken that minimizes the change in entropy. Any of these techniques, and all other techniques that cause the user to be placed in one of the existing clusters, are functionally equivalent from the point of view of this patent as long as they have put the user in a cluster that is highly likely to result in a good degree of similarity between the new user and other members of the cluster.

In this way, clusters have consistent meaning over time, and the user can stay in the same cluster, until a further split is deemed necessary. In preferred embodiments, this is handled by the expected large file simply not existing at a particular point in time, and this is detected by the client, which thus assumes it needs a new cluster assignment. It then queries the server system for a new assignment. For a pre-existing user this is easily determined because the new assignment was made during the split process, so the server returns another cluster identifier consistent with that split. For example, if a user was in cluster U0, he may now be in cluster U01 (where the leading 0 represents the lineage). (Of course any cluster naming convention can be used, but preferred ones encode the lineage in the name).

Other embodiments which use a fast enough clustering approach regenerate the clusters from scratch on a regular basis. In such embodiments the client either requests a new identifier for the cluster file, or one is sent automatically by the server when the client and server are in communication. (Note that this communication can actually take a number of forms. Rather than sending text strings, numeric or other identifiers can be sent which are in turn used by the client to build the necessary handle to access the file. Two examples: In a Gnutella-style system, this handle would probably be a search term. In a BitTorrent-style system, the handle might be the URL for the torrent.)

Still other embodiments have relatively stable clusters but continuously work to refine them by moving users from one cluster to another if such a movement provides superior clustering. For instance, periodically each user may be considered again as if it were a new user, and a decision made about what cluster it should go into. If it changes then that will be reflected in future communications between the client and the server (although the change does not need to be reflected immediately).

In some embodiments, the client has no persistent "knowledge" about what cluster the user is in, and when it's time to get a new cluster, queries the server for the information required to start a download of the appropriate one.

In some embodiments, users may be assigned to more than one cluster. As one example of how that might be done, a number of standard clustering approaches such as C4.5, assign probabilities for cluster assignments; thus a user might with a higher probability reside in one cluster than another. It would be possible to take the two clusters with the highest probability for a given user, and say that he resides in both of them. The invention is not limited to any particular approach to putting users in more than 1 cluster. The functionality is simply that the user would go in the clusters that provide a high match to his interests, and any technique that accomplishes that is functionally equivalent from the perspective of the present invention and is therefore within the scope.

In some embodiments, different clustering arrangements exist for different genres. For example a user who has both classical music and jazz in his collection might benefit from different nearest-neighbor communities generating different recommendations in each area. So, the entire clustering and downloading structure and steps, in some embodiments, are carried out more than once. In other (preferred) embodiments, each user still is in only one (or a small group of) cluster(s), but his client software finds different nearest neighbor sets, depending on genre, from within those clusters. Of course, in non-music applications, this concept is extended by means of the analogous principle to "genre" that exists in that other subject area. For instance, if the items are weblogs, then an individual might be interested in weblogs about Perl scripting and also weblots about Republican politics. These different subject areas are handled analogously to genres in the music world.

In order for the system to respond to the needs of users who are continually buying new music (viewing new weblogs, etc), in preferred embodiments it is possible for neighborhoods to be updated according accordingly. This means that the large files representing clusters need to be either re-downloaded or updated periodically. We will discuss below some of the ways this is accomplished in various embodiments. The scope should not be construed to be limited to these particular techniques. Rather, any technique that "enables the potential neighbor files to be updated or replaced often enough to increase the accuracy and pleasure in using the system" equally fulfils the required function and is thus considered to be in the scope.

In some embodiments, download file identifiers (which may be URL's, terms, etc.) are constructed based on two pieces of data: the cluster identifier plus the date. For instance a user might be in cluster U011. If the date is Jan. 27, 2004, the download file identifier might be U01120040127. The client can then get an update by, for instance, downloading the file containing that string in its name or by constructing a BitTorrent URL based on that string.

The client machine can then download the file upon whatever schedule is most consistent with the user's needs and desires. Bandwidth will be a constraint, so there is reason not to download the files too frequently. In preferred embodiments, there is a choice in the "preferences" section of the program whereby the user can specify how often he wants to update the file. He will probably do so less frequently if he has a dialup modem connection than if he has a cable modem. Some embodiments use information available in the computer (for instance, provided by the operating system) to determine the connection speed, and automatically choose a download schedule accordingly. Some ask the user to specify the download speed and automatically choose a download schedule accordingly. Other ways of determining a download schedule, including the user's manually starting each download, are all functionally equivalent and within the scope.

Some embodiments automatically cause files of different sizes to be downloaded according to connection speed (or at the choice of the user). One way this is done is for the server to store a tree of cluster arrangements. For instance, suppose clusters are arrived at by splitting bigger clusters in half, and the lineage of the cluster is represented in the file name. Then, for example, U0 might be the parent of U01, and U01 might be the parent of U011. Then a client with less bandwidth available to it might retrieve cluster U011 and one with a great amount of bandwidth but with a user with a very similar taste profile to the first client, might retrieve cluster U0. The difference is that the larger the downloaded cluster, the more likely it is that the true most similar neighbors, out of the whole universe of neighbors, will be found by the client.

In some (preferred) embodiments it is possible to either download a cluster as a whole, or download updates. For instance, using the naming convention we have used above, U01120040127-20040126 might be the identifier of the file that contains the difference data between an up-to-date representation of cluster U011 as it appeared on Jan. 26, 2004 and the version that was current on Jan. 27, 2004. Then a preferred embodiment will automatically choose whatever method will result in getting current more quickly. For instance, if no update has occurred in a number of days, it may be more efficient to download the complete file. But if the last update was recent, it may be more efficient to download a series of daily updates.

In a preferred embodiment making use of BitTorrent, the server stores, for each cluster, files representing the current complete cluster, individual updates for the last 6 days, and the last 4 weekly update files (files that update for a whole week). BitTorrent requests for any of these files cause them to be loaded to client machines, where they are henceforth made available in a peer-to-peer manner. Any such manner of scheduling updates is functionally equivalent.

Those skilled in the art will know how to create such update files. There are general "patching" software technologies, but more particularly it is easy to create custom approaches. For instance, if the cluster file contains a list of user ID's with each user ID followed by a list of the songs found on his or her computer, an update file may consist of a list of user ID's of users who downloaded new songs in the corresponding time interval, with each user ID followed by a list of the new songs and a list of songs that used to be on the user's disk and no longer are. All such representations are functionally equivalent and fall within the scope of the invention.

Another aspect is the fact that changes on the user's machine need to be uploaded to the server. In some embodiments this is done on a regular schedule when there are changes to upload. Preferred embodiments only send changes since the last upload rather than uploading the entire interest profile. Preferred embodiments don't send changes until sufficient changes have accrued that it is "worthwhile" to do an update. For instance, in embodiments where taste profiles include information about the number of times a song has been played, it makes a big difference when that count goes from 0 to 10, but very little difference when it goes from 1000 to 1001. A simple way to determine significance is to have a cutoff for the percentages involved. For instance, if play counts are used, the if overall they have changed by 1%, that might be considered significant. If simple presence/absence data is used, than a 1% difference in that data might be considered significant. Alternatively, the entropy of the data may be used. For instance, entropy can be calculated based on the exercise of choosing a "play" at random, and computing the probability that such a randomly chosen play instance would arrive at a particular song. So there is one probability for each song. Based on those probabilities the song entropy may be calculated. Then significance may be determined by a particular amount of change in entropy occurring, either on a percentage basis or based on a fixed minimum change in value. Any technique that determines that a desirable amount of change has occurred is considered functionally equivalent from the standpoint of the invention and thus falls within the scope.

In some embodiments the user can determine how much significance is required before an update occurs; in others it is automatically determined based on bandwidth; in others it is determined on a global basis by the server; in others some combination is used such as a maximum upload frequency being determined by the server with the user having the ability to set the frequency or significance required as long as it is below the global value; any number of other techniques are possible and considered functionally equivalent within the scope of the invention.

Note: Music is discussed in this specification for reasons of example only. The invention applies to other areas just as well, including text documents, videos, weblogs, and indeed any type of item where user interest can be determined by means of his association, and/or degree of association, with a number items of potential interest. Software developers will readily see how to create these alternative embodiments. It must not be construed that the invention is limited to the specific examples described in this specification.

The overall invention, in broadest form, consists of a server (or networked group of servers) that stores the cluster files containing interest profiles and distributes them to client machines, and client machines that then distribute those files to other client machines; the nearest neighbors are then chosen on client machines and used for purposes of recommendation and community.

Clusters should be large enough to include most users whose profiles are reasonably likely to be global "nearest neighbors" for any given local user.

It would be worth while to discuss one further sample application of the technology. That is one where users are purchasers of DVD's for viewing videos. The interest profile would consist of the list of DVD's owned by the user (perhaps with additional entries that are liked or particularly disliked by the user), optionally associated with the ratings. Numerous technologies are available for finding nearest neighbors based on such data, such as those used by Firefly or the movie recommendation patents of John Hey, or the present inventor's U.S. Pat. No. 05,884,282. (All such algorithms are functionally equivalent from the standpoint of the present invention.) This profile data is usually manually entered by the user.

In addition to forming communities and recommendations as already described, this embodiment adds functionality for making it visible to other users that one has DVD's one is willing to lend out, and for keeping track of DVD's that have been lent. Additionally, preferred embodiments have functionality for rating lenders of DVD's according to their reliability (much as is done on eBay or various action sites with respect to sellers). Skilled practitioners of the art of Web programming will immediately see how to create appropriate user interfaces.

In some embodiments this lending data is stored on the server for easy access by various clients and in others it is made available by peer-to-peer means.

The idea is that when the system finds people who have similar tastes, they will be able to help each other by lending DVD's to each other. Because they have similar tastes, they will be able to lend multiple DVD's. They may also email each other or chat with each other about DVD's of interest through addresses made available through the interface or through automatic means. These factors lead to a relationship of trust, which minimizes the risk in sharing DVD's. So such a service has the potential to do what netflix does, but since there is no central repository of DVD's, at much lower cost.

Of course other physical objects of interest than DVD's are the subject of other embodiments; CD's is one applicable subject area.

APPENDIX 3

Introduction (Appendix 3)

This appendix describes another way of implementing key functionality of the invention, including but not limited to facilitating retrieval of representations of nearest neighbor candidate taste profiles and associated user identifiers in an order such that said nearest neighbor candidate taste profiles tend to be at least as similar to a taste profile of the target user according to a predetermined similarity metric as are subsequently retrieved ones of said nearest neighbor candidate taste profiles.

The representations mentioned in the previous paragraph may be the user profiles themselves (including the taste profiles), or just the taste profiles (which should include an identifier of the user)—or they may be user ID's of the users, or URL's enabling the data to be located on the network, or any other data that allows taste profiles and associated user ID's to be accessed. These are all functionally equivalent from the standpoint of the invention.

So that it may be taken Sep arately, this Appendix describes the invention anew. The present invention is a new approach to dynamically creating online groups of similarly-minded people for both community-building and generating recommendations of items of interest to the communities.

The invention is a form of distributed computing for searching which we will refer to as "distributed profile climbing" or "DPC". In preferred embodiments it is a kind of middle ground between a server-based Internet service and a peer-to-peer one.

The invention consists of a networked computer system running special software. The network is typically the Internet (but can be any network which interconnects computers) and the computer can be a broad range of computer hardware that a user might own, a typical personal computer running with 256 megabytes of RAM a Pentium processor being one example. The connection to the network may be a direct connection, or may be wireless, based on radio, light, Ethernet cabling, etc.

Distributed Profile Climbing

Peer-to-peer networks are a popular way to handle such challenges as sharing files between many users. The main problem is that not everyone who wants to participate in such a network can do so fully. This is for a number of reasons—computers may not be on all the time, or they may be portable, or they may have firewall and/or network address translation issues.

Pseudo-peer-to-peer networks handle that problem by creating proxies for the machines of each user who wants to participate. These proxies exist on server systems, but typically the technical requirements for those servers are light because the proxies merely store and transmit data related to the machine they are proxying.

An example of this is Radio UserLand's "upstreaming". Radio UserLand is a software package that runs on end-user computers and lets users create weblog entries. Those entries may then be sent ("upstreamed") to UserLand's servers. Web users who wish to view a Radio UserLand customer's weblog can then look at the proxy data on UserLand's servers. Note that, in a world where everyone had computers always able to allow access to other users, there would be no need for this upstreaming to take place. Each weblog writer's machine could serve their weblogs to the rest of the world. But we are not in such a world, so the practical solution is to send the weblog data somewhere where can be always available to other people, in the form of a data object which is located at a particular URL on a reliable server. This data object is the proxy for the user's machine.

DPC networks share a common foundation with pseudo-peer-to-peer networks like UserLand Radio in the sense that each user's data is represented by a proxy data object located on a remote server. However, in DPC networks, this data contains a profile of the user in order to compare similarity of interests. In preferred embodiments, the proxy object for a user further contains key information for other users who have already been found to be similar in interests to that user. This key information is sufficient to enable the proxies of those other users to be accessed (typically, this would be by means of constructing a URL that accesses the proxies).

One very important aspect of searching for similar profiles is intelligently handling users that have already been compared at least once. In some cases, it may be desired to never compare them again; in others it may be desired to compare them again after a certain amount of time or a certain number of updates have occurred. Most approaches for taking care of this involve storing representations of which pairs of profiles have already been compared.

For instance some solutions store a table with a concatenated key containing the logon ID's of the two users that have been compared. But this is a problem. If we assume that over time every user will be compared to every other (ignoring the expense of those comparisons for now) and there are 10,000,000 users in the database, the result is a table with 100,000,000,000,000 records. That is not within the realm of reasonable possibility for affordable server installations.

However, now assume there are 10,000,000 users each with their own machine, and each machine stores the logon ID's approximately the approximately 10,000,000 users it may have been compared to over time. This is entirely within reason given the most computers being sold today are equipped with 10's of gigabytes of storage. This is the way DPC handles the problem, in embodiments which involve such lists. Preferred such embodiments contain the calculated similarity metric for each comparison as well as the date and time of the comparison, and other pertinent information may be included as well.

Moreover for embodiments that handle previously-checked lists, there is no need for the kind of very sophisticated, highly scalable database software that would be required to store that data on a central server.

Furthermore, in most DPC systems, the similarity metrics are computed on the user's machines rather than on the server. This is not a requirement, but it does help to distribute the workload and simplify the scalability issues for the server.

As a matter of practical implementation, preferred embodiments where there are large numbers of users divide the proxies for various users among Sep arate servers residing in one or more physical hosting sites. Usually the proxies are divided up in such a way that a hash function based on the user's ID can be used to determine which server (or subgroup of servers) hosts that user's proxy. The benefit of dividing the server side up this way is one of simplicity and cost—there is no need for a high-performance central database system. Instead the servers can operate in relative isolation to each other, even storing all data in local RAM for speed, using communicating with other server hardware for control and backup purposes.

An algorithm for one embodiment of the invention is shown below. Steps are carried out in the order shown. Deeper indentation is used in the representation of repeated groups of operations, or operations that are dependent on the result of an "if" test. An "else" relates to the previous "if" at the same indentation level. A "break" causes the process to immediately terminate the currently innermost loop, while allowing outer loops to continue undisturbed. The operations depicted carried by the software operating on end-user machines, except that the server is invoked to provide data on occasion.

First we will introduce some terms. THISUSER is the user whose machine the algorithm is running on. Each user has an associated NEIGHBORBAG which is his current list of ID's of similar users. In this example embodiment, the NEIGHBORBAG has a fixed maximum size. PREVIOUSLY-CHECKEDBAG is collection of users that have already been checked as potential neighbors (members of NEIGHBORBAG).

In the example which will follow, all similarities are between 0 and 1, and higher similarities are better. When similarities between THISUSER and another are considered, it is implied that one of the following happens: a) the user's machine requests that the server send the other's user's taste profile, such as an encoded version of the relevant data from his iTunes Music Library database, and the taste profiles of the two users are compared on THISUSER's machine, or b) the server compares the two users using that same data and returns the result to THISUSER's machine. The former has the overhead that the profiles need to be sent to the user's machine, which consumes network bandwidth. The latter adds more work that must be done on the server side, increasing the complexity of the server. Different embodiments need to trade off these factors.

repeat as long as THISUSER is online:
   ask the server for the ID of a random, already-existing user;
      set N to be this returned ID
   set PREVCLIMBER to null; set PREVSIMILARITY to 0
   repeat:
   if N is a member of THISUSER's PREVIOUSLY-
      CHECKEDBAG, and was added to it <6 months ago:
   break
   ask the server for N's NEIGHBORBAG; save it in CLIMBERBAG
   set C to be the member of CLIMBERBAG that is most
      similar to THISUSER
   add all members of CLIMBERBAG that are not already
      there to THISUSER's PREVIOUSLYCHECKEDBAG
   set CSIMILARITY TO C's similarity to THISUSER
   if CSIMILARITY>PREVSIMILARITY:
   set PREVSIMILARITY to CSIMILARITY
   set PREVCLIMBER to C
   set N to C
   else:
   if there are any members of THISUSER's NEIGHBORBAG that have a similarity to THISUSER that is <PREVSIMILARITY:
   If the maximum size for NEIGHBORBAG has been reached:
   remove the member of THISUSER's NEIGHBORBAG
      which has the least similarity to THISUSER
   add PREVCLIMBER to THISUSER's NEIGHBORBAG
   break Note that this invention must not be construed as being limited to the algorithm above, which is presented merely as one of the more simple ways of implementing the invention.

However, all approaches that fall within the scope of the invention have in common that profiles arrive at the client node in an order that tends to receive the profiles most similar to the current user first. Accordingly processing is included above whereby, a profile isn't retrieved again until a sufficient time period has passed for the profile to have appreciably changed. In the short term, the most similar matches will exhaust themselves and less similar matches will follow.

At the beginning the retrieved profiles are essentially random, but the process quickly "climbs" to strong matches. The process therefore will not retrieve profiles in exactly the ideal order; however it the techniques used do not generally retrieve the profiles in exactly the ideal order. This method will retrieve profiles in a good enough order that once climbing has reached a high level of similarity and profiles are not being retrieved because they already have been, we have the required general decreasing similarity.

The climbing is accomplished by means of calculating the similarity metric with respect to the nearest neighbors of a user for which the similarity has previously been calculated, where the latter was found to be at a level high enough that it is worth the expense of going on to retrieve the interest profiles for that user's neighbors to determine whether one or more of them will have an even greater similarity to the target user.

Some peer-to-peer networks, such as the Morpheus file-sharing network, have an architecture which causes data which would traditionally be stored on a server to instead be stored on a subset of user computers. We will refer to such servers, in the context of this invention (not necessarily in the Morpheus context) as user-associated servers. In the conduct of the illegal file trading of copyrighted files, the main "advantage" of this technique is arguably that there is no company which controls the master index and which can therefore be prosecuted or sued.

However, from the point of view of the present invention, there is another reason, and that is to completely (or almost completely) eliminate the expense associated with a central server. If there is a central server (or server network Sep arate from user-associated servers), then some entity has to pay for maintaining it, providing the bandwidth, etc. Without one, that necessity disappears. Eliminating that necessity enables this invention to be embodied, in a sense, in "pure software" such as an open-source software project, instead of needing to embody it in a project run as a business in order to pay for the servers. Based on the experience of the file-sharing networks, there are enough users who do not have severe firewall or connectivity issues and who are willing to help others by making their resources available that this is a feasible solution. Moreover, unlike file sharing networks, there is little real problem if a user-associated server becomes temporarily or permanently unavailable, because the searching is normally done in the background rather than in real-time.

Note that this specification has already described how a hash of the user's ID can be used to determine which server to access for his data. In order to extend that to using user-associated servers, more is required (and the already-described hash may or may not be part of that).

In one set of embodiments there is still a central server but rather than serving the taste profiles, it contains a list of identifiers which can be used to construct the URL's where the taste profile for each user may be found. So the actual amount of data that needs to be stored on, and sent from, the server is far less than in the earlier description. For many implementations, the load will be light enough that a single desktop computer with cable modem or DSL (or similar) connection to the Internet will be enough.

The Gnutella network, for example, provides a "cloud" of user-associated servers, many or all of which store the URL's (or data that can be used to construct the URL's) of many or all of the other user-associated servers. When a user obtains Gnutella-compliant software (whether by download or by other means) it normally is distributed with a list of user-associated servers that are frequently available. The software then contacts those servers, and can get lists from them of other such servers. The local node is then updated with this information, and it is available to other nodes that might eventually contact this node. Thus, no single central server is required.

This specification will not describe the construction of such networks in detail; rather the technical descriptions for Gnutella and other such networks, readily found online using such search tools as Google, should be used. Use such existing networks as a model for constructing a "cloud" of nodes which point to each other and obviate the need for a central server.

Preferred embodiments of the invention where the profile data is stored on user-associated servers generally use the same computers for storing that data as are used by their associated users as their day-to-day computers, with the exception that they must be accessible to inbound connections (i.e., few if any Firewall or NAT issues should apply and they should be connected to the Internet, and turned on, a substantial amount of the time).

Each user-associated server stores the profiles and neighbor lists of a number of other users.

For preferred such embodiments, the step of retrieving a random user ID is modified so that instead of asking a central server, first a random user-associated server in the cloud (or semi-random, influenced by the fact that only a subset of the cloud may be known to the node at the time) is chosen, and then that server is asked to provide a random user ID of those whose profiles and neighbor lists are stored on that computer. Then the algorithm proceeds as before, with the exception that instead of retrieving just the ID of other users, enough data is retrieved to construct a URL where that user's information is available. Then it is accessed at that location. Further, if an access fails because the URL doesn't respond or the data that is supposed to be there isn't, a "break" is executed and the innermost loop explicitly spelled out in the pseudocode is exited.

Further embodiments lower the percentage of times non-response or not-found errors occur by providing multiple URL's where the same data can be found on different user-associated servers. Then if one fails, one or more fallback machines can be tried.

In preferred embodiments, user-associated servers take responsibility for serving the nearest neighbors of that particular user to the broader community. This causes data for similar users to be gravitate toward being stored on the same machines. One advantage of this technique is that if user-associated server A is being accessed and provides a NEIGHBORBAG for similarity testing, it is likely that when the accessing node wants to get the taste profiles for the users in the bag, seconds or minutes later, that machine will still be available on the network.

A further improvement is that, instead of sending the taste profiles for the accessing user for the similarities to be calculated, they can be calculated on the user-associated server in cases where it is judged that it would be more efficient when data transmission expenses are calculated, to send the data there. In such a case, the querying node would upload its taste profile to the user-associated server so that multiple comparisons can be carried out there without further need for network data transmission.

In further embodiments, such user-associated servers not only store the neighbors of their associated users, but also other neighbors with relatively high similarity to other users that are stored on that user-associated server. For instance in some embodiments a centroid may be calculated that represents an average of the taste profiles of the users stored on that server. One type of taste profile contains identifiers for every song a user has played on a particular target platform (such as Apple's iTunes), together with the date it was first added to the user's collection and the number of times he has played it. A centroid averaging a number of such user profiles might contain the identifiers for all the songs played by any of the associated users, together with, for each song, the average of the dates it was added to the system and the average number of plays of that song per user.

The algorithm described above to find the most similar neighbors for a user may be carried out but with respect to this centroid rather than with respect to the user. The ID's of the users most similar to this centroid are stored in a neighbor list for the centroid, and their profiles and neighbor lists (together, their proxies) are the ones that that particular user-associated server takes responsibility for serving to the community. But it should not be construed that the invention is limited in scope to the concept or "centroid" or "averaging." Any summary of multiple user's profile information that is comparable via a similarity metric to an individual user's profile is equivalent for the purposes of the invention.

For example, in some embodiments that involve user's interests with respect to text documents, a user's interests may be captured in a list of the most unusual keywords that regularly turn up in text they read. For instance a paleontologist might read text containing the word "archaeopteryx" fairly frequently. The exact frequency isn't as important as the fact that the population at large very rarely reads text with that word whereas the paleontologist frequently does. So, the paleontologist's interest profile can be realistically represented by a list of such words that meet certain predetermined thresholds for "unusualness" with respect to the general population, and "frequency" with respect to the user himself. Extending that concept to a group of users rather than a single user, it is clear that the interests of a group of similarly-minded individuals can be represented by a list that contains all the words that are in any of the individuals' personal word-lists (or that are in some predetermined proportion of such lists). This is a completely different approach from using averaging to create a centroid, but it falls equally within the scope of the invention, as do all other approaches which serve the purpose of representing an individual's interest where individuals are concerned, and summarizing such interests for a group where groups are concerned, as long as it is possible to compare the interest profiles of individuals to each other or individual interest profiles to summary interest profiles or summary interest profiles to summary interest profiles and calculate appropriate similarity metrics. (With respect to the word list, a simple similarity metric is to calculate the percentage of words out of the total pool of words formed when the lists are combined are held in common. A more sophisticated approach is to consider every word in the combined list to be a "trial", with success being that the word is held in common; the similarity metric is then the posterior mean based on a binomial distribution and a beta prior.) Note that this process may frequently result in more than one user-associated server hosting the proxy of a given user. That is good, because that allows for redundancy in the system for times when a user-associated server is not available. Moreover, there is more redundancy for users who are similar to a lot of users then for users who are similar to only a few others. This allows for providing the most reliable and efficient service to the most people.

As a further example, in some embodiments the summary is simply the taste profile of the user associated with the user-associated server that is directing the search. By finding nearest neighbors to that such a user is also finding neighbors who are relatively similar in taste to other users whose profile is stored on that user-associated server, as long as the question of whose profile shall be stored is also resolved by virtue of having a high similarity metric with respect to the user associated with the user-associated server.

In further embodiments, each user-associated server carries out searches using an algorithm almost identical to one of those described above, with the exception that the search is done with respect to similarity to the collection of users whose proxies (whether the proxy contains the taste profile or the user's neighbor list or both and/or contains other items) are already being served from that particular user-associated server. (This is as opposed to doing such searches with respect to each individual user whose proxy is stored on the server or facilitating, by serving data, such searches carried out by the individual user-associated nodes.) This may be done, as described above, by comparing other users to a centroid of the collection or it may be done by other summary means (all of which fall within the scope of the invention). The standard literature on the subject of data clustering will reveal a number of methods that are equivalent for the purposes of this specification. In preferred such embodiments, the user who is associated with the user-associated server is always among the users whose proxy would be added to that collection if the user wasn't already there. For instance, in the method which involves a centroid produced by averaging the profiles of the users, the algorithm would never remove the user associated with the user-associated server from the list of users whose profiles are averaged to produce the centroid.

Notes for Appendix 3

A central server may be not only a single server computer, but a set of such computers, the distinguishing characteristic not being the number of computers in the central server, but rather the fact that they are not associated with a particular user but rather made available on the network to serve data to a substantial number of user-associated computers.

When this specification uses the term "associated with" for the relationship between a user and a computer, the computer is the computer that the user normally accesses to get the benefits of the system, for instance, viewing a list of the users that are more similar to him than any others that have been examined.

The term "target user" is used occasionally in this specification to refer to a particular user who is using the invention and for whom the invention has found, and/or is finding, other users with similar interests and/or tastes.

Preferred embodiments make a display of the individual users who have been found to be most similar to the target user available through a computer user interface. In some embodiments this takes the form of a list; in others there are other displays such as images representing the users in 2D or N-Dimensional space. In some embodiments the positions such images take with respect to each other in the visual plane represent how similar they are to each other.

Preferred embodiments make recommendations to the target user of specific items based on a list of nearest neighbors, that is, a list of neighbors who are relatively similar to the target user in taste when with respect to other users of the system. They do this by processing the preferences of the nearest neighbors in ways that are similar to how this is done in other nearest-neighbor-based collaborative filtering systems such as, for example, in the GroupLens Usenet filtering system, http://www.si.umich.edu/~presnick/papers/cscw94/GroupLens.htm, incorporated herein by reference, or the system described in Upendra Shardanand's 1995 thesis, Social Information Filtering: Algorithms for Automating "Word of Mouth," http://citeseer.nj.nec.com/rd/61053528%2C323706%2C1%2C0.25%2CDownload/http://citeseer.nj.nec.com/cache/papers/cs/15862/http:zSzzSzmas.cs.umass.eduzSz% 7EaseltinezSz791SzSzshardanand.social_ information_filtering.pdf/shardanand95social.pdf, incorporated herein by reference. Note that those two papers, and others, describe how recommendations may be made once a list of nearest neighbors has been determined, and those and other approaches exemplified by those may be used once such a list has been determined, regardless of the particular calculation originally done to determine the degree of similarity another user has and thus how the decision was made about how to add him to the list of nearest neighbors.

However, it is important to note that while the papers mentioned above make recommendations based on ratings manually entered by the users, the present invention may be used in situations where no such ratings are available. Instead other information may be available, such as the fact that the user has purchased particular items, or has chosen to experience them a certain number of times (for instance, has played a musical track a certain number of times). When only purchase data is available, a purchase can be considered to be equivalent to a rating of "good" and no purchase can be considered equivalent to a rating of "poor". When the number of times a user has chosen to experience an item is available, an easy way to approximate the effect of having ratings is to rank the items by the number of experiences. Then divide the rank by the number of items. This results in a number between 0 and 1 that can be used as a rating-equivalent, normalized to that interval so that the "ratings" of all users are on the same scale. So the techniques mentioned in the afore-mentioned papers, and others, are still usable even where there are no explicit ratings.

However, for purposes of example, a particular technique of making recommendations for situations where nearest neighbors have been found and "number of experiences" data is available for each item will be presented here.

This technique is to simply add up the number of experiences for each item for all nearest neighbors. For example, assume that out of a universe of 1,000,000 music fans, the system has found 100 nearest neighbors for the target user. For each item associated with each fan, there is a count of how many times each song has been played. If the system simply adds up these counts for each item, the item with the highest total count may be considered to be the most popular item in that community, and should be recommended to the target user if he hasn't already experienced it. Equivalently, one can compute the arithmetic mean of the number of plays, where the number of plays is 0 for users that haven't experienced the item at all.

A variant of the approach described in the previous paragraph that is arguably more reliable is to compute $\log(1+K)$ for each neighbor/item combination, where K is the number of times the user has experienced the item in question, and then calculate the sum of these values for the population of nearest neighbors. The higher that sum is, the more highly the item should be recommended. The advantage of using the log is that for an item to be recommended highly, it is more important for the item to be experienced often by a large number of nearest neighbors than it is for a few nearest neighbors to experienced the item a huge number of times.

The same two papers as mentioned above that discuss collaborative filtering, and others such as the specification of my own U.S. Pat. No. 5,884,282, herein incorporated by reference, describe different ways of creating metrics to capture degrees of similar between two users. All such metrics fall within the scope of the invention. The invention isn't limited to particular metrics; rather the focus of the invention is on the structure of the search and where the relevant data is stored.

A similarity metric that is used in preferred embodiments where explicit user-entered ratings are not available is the following. Assume user A is the target user, and we want to know how similar user B is to user A. We calculate an approximation, subject to certain assumptions which are useful to us but may not be true in the real world, of a certain probability. This can be loosely summarized as being probability that, if a randomly chosen item X not in A's collection but in B's collection is put into A's collection, that if we pick a random time in the future when A is experiencing an item from his collection, it will be X. An implementation of this concept that teaches the technique is included in the tasteprofile.py module included the computer program listing appendix and described in Appendix 4.

Embodiments of this invention serve the useful purpose of determining which other participating users are most similar to a user who is a participant in the system, and storing that information in the computer for purposes of displaying that community and/or making recommendations of desirable items. Further embodiments not only store that information, but display the community members and/or recommendations through the system's user interface.

Some embodiments store each user's profile on their associated computers. Due to issues mentioned above, many user-associated computers may not be accessible to other users from the internet. So a technique must be provided by which users can serve their profiles when they are stored on user machines. Gnutella-style networks provide an example for this. Nodes which are accessible from the Internet allow incoming connections to be made from nodes which are not necessarily connected. Then, data on those not-otherwise-accessible nodes is made available to other nodes on the network, through the network-accessible nodes which the not-otherwise-accessible nodes are connected to. In the case of Gnutella, this data includes lists of available files and the files themselves. (See http://www9.limewire.com/developer/gnutella_protocol_0.4.pdf, hereby incorporated by reference, for more information on the details of the Gnutella approach.) In the present invention, the network-accessible servers usually store lists of the user ID's associated with the nodes they are connected to, and when a request arrives for data associated one of those ID's, the request is routed to the appropriate connected node, the data is retrieved by the network-accessible node, and then sent by the networked-accessible node to the requesting node. Most embodiments that use the search algorithm described earlier in this specification modify it when it is used in the configuration described in this paragraph so that if the data for an ID is not available a "continue" is called in the innermost loop so that control goes to the top of the loop, and processing continues as if that information had not been requested. Note that to facilitate "hits" occurring as frequently as possible, nodes normally try to connect to network-accessible computers who are on their nearest-neighbors list. This makes it likely that network-addressable nodes will be connected to some of their associated users's nearest neighbors, so that when the interest profiles of neighbors are needed by the algorithm, they can more often be retrieved. In general, the presented algorithm is modified so that where, originally, ID's of similar users are requested, information is provided that can be used to construct a one or more URL's where the information can be found. If the information is not found on a directly network-accessible computer, the URL of a network-accessible one (such as the one providing the URL!) can be given, which includes parameters such as the ID of the user whose information is desired, to tell that node which possibly-connected node to get the information from. An individual of ordinary skill in the art of peer-to-peer software development will understand how to create the necessary software in accordance with this description. It should be stressed that this paragraph is for example only, and that there are many equivalent variants that involve, for instance, caching data on intermediate user-associated nodes, transporting profiles to other nodes for comparison, etc. This invention's scope must not be construed as being dependent on specific techniques for making the data and computations available in a peer-to-peer setting.

In some embodiments two forms of interest profiles are created and stored. One is a very small (in terms of the amount of data) representation. For example, if the main interest profile contains the song names, and artist names for songs in the user's collection and the number of times he has played each one, which could have thousands of entries, this miniature profile may contain only the user's most frequently-played 10 songs identified by a hash such as that generated by Python's built-in hash( ) function. Preliminary screening, including climbing, happens as described elsewhere in this specification using the miniature rather than the full profile. Then as a last step, before adding another user to the target user's nearest neighbor list, the full profiles are checked to be sure the similarity metric is really high enough that the user should be a nearest neighbor (for instance, that it's higher than the metric associated with the least similar neighbor). If it doesn't meet this final test, it doesn't go on the list.

When a miniature profile is used, any technique that serves to produce a relatively small (from the perspective of number-of-bytes), not necessarily complete, representation of the data in the interest profile may be used. The scope of the invention is not limited to particular miniaturizing technologies. For instance, in addition to the simple approach described above, applicable approaches include using all of the item hashes without any counts, using a random selection of items and including the song name itself rather than a hash and optionally further using standard compression algorithms such as are in the standard Python zlib library.

"Neighbors," "users," and similar terms are often used in this specification to represent their interest profiles, ID's etc.; the meaning is clear in the context.

APPENDIX 4: Source Code

The source code is contained on the computer program listing appendix. Notes about several specific modules follow:

MODULE: tasteprofileclass.py

The pair of classes appearing in this module, CalcData and TasteProfile, are tightly connected. Each TasteProfile object may have a number of associated CalcData objects. The CalcData objects represent one song in the collection of the user whose TasteProfile it is.

Methods are provided for loading the object from various sources; a programmer of ordinary skill will readily infer the formats from the input code.

It is worth noting that for convenience and to save memory, songs are frequently identified by an MD5 hash based on combining and normalizing their artist, album, and song names.

The most important method is probably TasteProfile.calculateSimilarity( ), which compares the current called TasteProfile object with another one passed to it as a parameter. Usually this is used for the local user to sequentially compare his profile to those of other users, in order to find the best ones—the nearest neighbors.

In such usage, a nearest neighbor list is maintained of a predetermined length is maintained, and when a profile of greater similarity to the local user comes along, compared to the least similar of the current nearest neighbors, the least similar one is removed from the list and the new one added.

MODULE: recommenderclass.py

This module handles the task of using the list of nearest neighbors, and their associated profiles for recommendation purposes.

It makes recommendations, subject to an "adventurousness control." When the control is at one extreme, it looks for consensus among neighbors; as it moves toward the other extreme, it is more and more sensitive to opinions of individual users. (In the current embodiment, these opinions are expressed passively simply by recording how many times each song is played.)

MODULE: genrerankhandlerclass.py

The code in this module represents one way of clustering cluster data containing songs where the songs (or most of the songs) have associated genre information. Of course, it can be used analogously for other subject areas; for instance in the area of academic research, it could make use of the papers in the users' collections (rather than songs), and their associated keywords (rather than genres).

This algorithm has the advantage that it is much faster than most general clustering algorithms, due to making use of the effort that originally went into creating the genre information. Furthermore, programmers of ordinary skill in the art will readily see various ways of improving the speed of the code further (at the cost of more code complexity).

MODULE: clusterfitterclass.py

On a server, this is a helper class for genrerankhandlerclass.py. However, it has another use as well. On the client, it serves to tell the clients which identifier is associated with the cluster a client should download first. That is, it outputs a sorted list of clusters with the ones most likely to yield high similarity to the local user.

It does that by means of summary data (the xInitData parameter on the _init_ method) that is sent to the client from the server which contains data that summarizes the differences between the clusters.

In the current embodiment (from which this code is derived), this enables clients to request the clusters that are most likely to have good similarity matches first; this downloading is accomplished via BitTorrent. We do not include the BitTorrent-related code here because techniques for accomplishing a BitTorrent download are readily apparent to a programmer of ordinary skill.

APPENDIX 5

This Appendix describes a class of embodiments wherein some of the user nodes run software that has only a one-way connection to the other nodes and server (if one exists). These embodiments include cases where the connections to the other nodes and server (if one exists) involve more than one medium. We will focus on a specific example where some of the user nodes, which may be full personal computers or may be hand-held devices such as Apple Computer's iPod, have radio circuitry incorporated into them which allow them to receive transmissions from terrestrial or satellite radio broadcasters. (In the case of satellite transmitters, these may include the specific hardware associated with the Sirius or XM satellite radio services.)

In the prior art the time of this writing, Sirius Satellite Radio has announced a handheld device, to be called the S50, which will work with its satellite network and save songs on its internal data storage. It does not have the ability to receive satellite signals on its own. Rather it can only receive songs when attached to a docking device. Samsung has announced its neXus XM Satellite Radio/MP3 Players. Users will be able to "tag" songs they hear on the radio for purchase through the XM+Napster online service. The neXus unit will not have a built-in antenna; rather it will connect to a dock which has an antenna, and will record songs from the satellite service for later play without the dock attached.

XM Satellite Radio sells a Delphi XM SKYFi2 units which includes internal storage for pause and 30-minute replay, although the antenna is separate. It has announced a Delphi XM MyFi unit which is handled and includes an internal antenna.

What is missing from the prior art is a way to enable the user to receive personalized recommendations or a "virtual channel" constructed automatically for the benefit of that user to enable him to have the experience of a radio channel specifically geared towards his or her individual tastes.

The present invention provides a solution to this need.

In this set of embodiments, the nodes with two-way connections work as described elsewhere in this specification. On the local node, reference data is collected, nearest neighbors found, recommendations are generated, and the taste profile of the local user is distributed to other user nodes to be used by them in a similar way if they are deemed by the software to be similar enough in represented taste and interests to those local users. Not all embodiments of this variant that fall within the scope have the nodes with two-way connections receiving the taste profiles in an order related to likely similarity to the local user's tastes. Typically these nodes are connected by a network such as the Internet which readily handles two-way communication.

The nodes with one-way connections, in preferred embodiments, receive taste profiles via satellite radio. Satellite radio uses digital signals that can easily send taste profile data on one or more channels while sending audio and/or video content such as podcasts on others, and/or it can send a subset of those types of data on a single channel by transmitting one type at one time and other types at other times.

In preferred such embodiments the one-way nodes, which in further embodiments may be one-way at some times and two-way at other times, are hand-held devices like the Apple iPod which include a CPU and memory to store content data such as audio and video data, where such memory will include RAM and may include hard drives, flash memory, or other kinds of persistent storage. Hand-held devices are meant to be carried from place to place by an individual, and many such devices do not have ongoing two-way communication abilities due to the difficulties and expense of maintaining network connections from remote locations. For such devices, satellite radio provides an excellent transmission medium for the taste profile and digital content information used by the present invention.

The one-way devices (which may, in some embodiments, have two way connections at other times), receive taste profile and content information. They also have at least one way of inferring the user's tastes and interests. In various embodiments these may include buttons to rate content he is hearing and/or viewing, or they may include monitoring which content the user stops prematurely or skips over using a mechanism such as a fast-forward button, and which content the user repeats. Some embodiments monitor whether a user uses a rewind-like button to experience portions of content more than once; for instance in a listening to spoken word content, the user may want to hear some of it more than once to aid his understanding. Preferred embodiments have an input mechanism such as a button that indicates that a user likes a unit of content (such as a song) and would like to hear it again.

By using such mechanisms, input is provided to the software whereby the software creates a profile indicating certain likes and/or dislikes of the user.

Taste profile data received via the one-way medium is then processed as described elsewhere in this specification. Taste profiles that are similar to those of the local user are stored and used for recommendation purposes. User profile information may also be used for community purposes; for instance, in a cell phone embodiment, a telephone number or address may be provided whereby the local user can call the other user whose taste profile matched. In some such embodiments, additionally, a contact recipient will receive bio and/or taste profile information from the local user and hear or view it before deciding whether to take the call; in further such embodiments the receiver has criteria set in his software that automatically screen for certain biographical characteristics or a certain degree of similarity before the user is alerted to the incoming call. In further such embodiments location data such as GPS information is used, so that the local user is made aware of the location (which may not be current) of the remote user, or the software screens on location data so that the local user is only alerted to profiles associated with nearby locations, and/or, alternatively, the remote user's software screens attempted contacts based on the location of the local user.

Note that preferred such devices have both satellite radio-receiving and cell phone capabilities. Satellite radio reception may be maintained with typically lower consumption of bandwidth and energy resources than cell phone connections, and typically have higher data transfer rates, so it is helpful to receive a stream of data from the satellite, while also having the hardware required to allow the user to make a cell phone call.

A key to this class of embodiments is the fact that the overall network contains both one-way and two-way nodes at a given instant in time (again, some of these nodes may change roles at other times). This enables taste profile and (in preferred embodiments) biographical information or other data such as location to be sent on the network to be received and used by the one-way, receive-only nodes. Because of this mix of node types, it is practical to collect the taste profile data on the two-way nodes which is used to make recommendations on the one-way nodes.

In preferred embodiments of two-way nodes containing a broadcast (for instance, satellite) radio receiver as well as wi-fi, ethernet, or other connection to a typical Internet service such as a dial-up service, cable modem, or DSL, data derived from other users is substantially or wholly received via the broadcast radio receiving circuitry, while data is uploaded via the Internet. This minimizes the use of limited Internet "bandwidth" for receiving large amounts of data.

A detailed description of a particular embodiment:

Software incorporating all or much of the software contained in this specification runs on a large number of desktop personal computers, connected to the Internet. We will refer to it as the Goombah software, since there is presently software of that name that incorporates much of that code. The users of those computers use Apple Computer's iTunes software to play music. iTunes writes an XML file XXX on disk containing the identifiers for each track in the user's collection. The Goombah software XXX reads this XML file and uses it as the user's taste profile data. This data is sent to a server XXX, under the control of which the data is communicated, not only to other personal computers, but to a terrestrial radio transmitter XXX that sends the data to the satellite XXX or satellites being used to facilitate a satellite radio service such as XM or Sirius. From the satellites it is broadcast to portable units XXX which could be, for instance, Sirius or XM-enabled versions of Apple Computers iPod device.

On the other personal computers, the taste profiles contained in the data play the role of candidate nearest neighbors; the nearest neighbors are selected and used to provide content recommendations, as described elsewhere in this specification.

On the portable devices, an analogous process of neighbor selection and recommendation occurs. However in the embodiment currently being described, the recommended music takes the form of at least one virtual channel. That is, from the user's point of view, it behaves much like a standard satellite radio channel, but at least much of the time, the content is selected, scheduled, and played on the user's local portable device.

In this embodiment, there is an easily accessible Save button. When the user first starts using the device, he tunes into one of the standard satellite channels which he thinks is likely to be a good approximation to his tastes. When he hears content (for instance, a song), that he particularly likes, he presses Save. (In some other embodiments, there is a button for the explicit purpose of enabling the user to indicate that he likes a song; there may be another one to indicate dislike; or there may be an input mechanism such as physical "radio buttons," which allow only one to be pressed at a time, allowing a degree of liking a song to be expressed; other variants are also applicable. In further embodiments there is not a dedicated physical button for this purpose, but instead controls are provide whereby the user can navigate through a menuing system to choose a "Save" option. Samsung's neXus player will have a mechanism through which the user can "tag" a song for purchase; since available photographs do not show a dedicated button for this purpose but rather an input mechanism that appears similar to the iPod's for navigating a menu system. The tagging function is undoubtedly activated through that menu system. In the context of the neXus device, tagging a song implies the user probably likes it because most people will tend to buy songs that they like [although some will buy songs for others such as their children; still the statistical likelihood that tagging implies liking a song makes it appropriate for our purposes]. So embodiments built into an improved neXus device may use the tag function for this purpose. Alternatively or in addition, a Separate "I like this" option may be available through the same menu structure which would serve the purpose here attributed to the Save button. Ideally, such a future device will have a built-in antenna akin to the Delphi XM Myfi's antenna. All such variants fall within the scope of the present invention.)

The song has been stored in RAM even after the earlier parts of the song were played. So it is in RAM and available to be moved to persistent storage such as flash memory or a hard drive when the Save button is pressed. Typically there is a pause between songs, and pressing Save during that pause causes the previously played song to be saved. When a song is Saved it can be played again later with greater frequency than would be the case if the user simply waited for the satellite channel to broadcast it again. The portable device automatically schedules the song to be played again later, and does the same for other Saved songs. For instance Saved songs may be played daily for the first week, then every other day for the next week, then every third day for the first week, etc. An unlimited number scheduling variants are possible. The embodiment described here additionally mixes songs from the user's favorite satellite channels with stored songs; this is one way the user hears new songs that he can decide to Save or not.

Also, since the device described in this embodiment has iPod-like functionality, the Saved song may be found and played again at the user's will by means of the iPod's standard navigation features, including being played automatically in the device's Shuffle mode.

So the Save button has easily-understood use and value for the user. However, it also serves the purpose of being an input for taste profile data. When the user Saves a song, it goes into his taste profile. Unsaved songs may not go there, although in some variations of this embodiment, satellite songs that the user has heard in their entirety (i.e. he didn't turn the device off, select a song to play from the device's internal library, switch to another satellite channel, or perform some other action that cuts the song off), it is stored in the profile with diminished mathematical weight. And in some variants, songs that were cutoff are stored as songs that are disliked.

If the device is permanently one-way, that is, it never has a direct or indirect (through a PC) ability to send data onto the Internet or another network, the taste profile built by the Save button (and/or other techniques) is never made available to other users. However, for the local user's benefit, it enables him to discern which candidate neighbors are received from the satellite are nearest neighbors, and the device can therefore generate recommendations in the usual way.

As the taste profile for the user of the portable device grows because of the use of the Save button, the recommendations that can be generated in the usual manner become more and more accurate.

The embodiment currently being discussed involves a unique identifier for each song, which is an md5 hash of a concatenation of the song artist, name, album defined by the makeSongHash functioned in the accompanying code. (Other variants use other techniques such as fingerprints of the audio data, an md5 hash of a text representation of the audio data, etc.) This identifier is contained in the taste profiles for the user and is used as the representation of the song in that data (or as one such representation).

When a song is recommended, it goes into a list in the device's storage, and is checked against a broadcast schedule transmitted periodically by the satellites and received by the device. The device then knows to record certain songs sent on certain channels in the future, and does so when the time comes, saving the song data into persistent storage and adding the song to the device's music library. In this way the device builds a library of music that the user is likely to enjoy. This music is added to the user's virtual channel, and also available to play at his will through the device's song navigation mechanisms.

With regard to the virtual channel, the result is as if there a radio channel dedicated exclusively to that individual user's tastes, which gets more and more finely tuned over time.

When the portable device is connected to a personal computer, for instance via FireWire, USB, BlueTooth, Ethernet or wi-fi, songs downloaded from the satellite may be transferred to the computer, either for long-term storage in that computer or played using the computer's hardware using data only persistently stored on the device.

The embodiment currently under discussion can be used in two modes: subscription and purchase modes.

In subscription mode, the user pays a set fee per month, and can store as much music downloaded from the satellites (and/or from other sources) as well fit in the device's storage and they may be played as frequently as the user desires. (In some variants there is a tiered subscription service, where for a particular monthly fee, a particular number of songs or artists's music may be stored persistently or a particular amount of storage may be allocated; or songs from the satellites may be played only a particular number of times.)

In purchase mode, Saving a song causes the song to be purchased. (In some variants the Save button is labelled "Purchase".) When the device is eventually connected to a two-way network or to a wireless-enabled financial "smart card" with debit capabilities, or to analogous financial technologies, the cost is deducted.

Further variants of the embodiment described above:

Rather than receiving a schedule from the satellites the schedule may be received over the Internet or other network for devices that sometimes have connections to such networks. In further embodiments no schedule is available and instead, a directory is provided of channels together with taste-descriptive data such as a list of genres that each channel focuses on or a list of representative artists, which is used to determine which channels are likely to contain songs the user will want to hear and/or are or will be recommended.

In typical embodiments, taste profile data contains genre info for songs in the taste profile, or the service provides a look-up table mapping song identifiers to genres. When the channels have associated genre information, they can use that information for recommended songs to choose likely channels to listen to receive the songs. When information such as representative artists is used to describe channels, the artists that most frequently appear in taste profiles having the recommended song can be matched against the lists of artists describing different channels, and the channels that best match the currently recommended-but-not-yet-downloaded songs are the ones that the device focuses on in waiting for the song to arrive.

Some embodiments use sonic descriptors of each channel to describe it. For instance, the companies Savage Beast and SoundFlavor describe each song by a set of attributes including such factors as tempo, instrumentation, sex of the singer, and hundreds of others. Some them are human-generated, and some are software-generated (the software examines the audio data) or generated with the aid of software. It is obvious that with such a collection of attributes, average values or other kinds of summarizations may be generated for each channel that tends to describe the music played on that channel. And a vector or other structure may be provided that enables the attributes associated with recommended songs to be determined.

Such structures may be downloaded via the Internet or from the satellites. On a special channel or interspersed with other data, the satellites can send the attributes associated with each song, either at the same time as a song's audio data is transmitted, or Sep arately; this occurs in preferred embodiments.

In some embodiments the attributes associated with songs the user likes, for instance as signified by pressing the Saved button, are summarized by software within the handheld device. For example average values of the attributes can be calculated using arithmetic or geometric averaging, or only the attributes most frequently associated with liked songs may be counted, or other summarization techniques may be used; these comprise a taste profile of the user instead of, or in addition to, the taste profile built from identifiers of liked songs (where "liked" songs may also be signified by being already-owned by the user). In some embodiments there is an additional input device such as a button that signifies that the user does not like a song; then the averages and/or presence/absence counts used to generate the taste profile may be adjusted negatively by that control in association with a particular song.

In some embodiments, each user is associated with a song attribute, and the value of the attribute depends on whether the associated user has the song or not, and/or on how often the user plays the song. So each song has an associated list of attributes corresponding to users, either instead of or in addition to other attributes such as ones derived from the sonic content.

In embodiments where there are too many song attributes to be downloaded without using too much bandwidth, and where the attributes are statistically correlated, factor analysis may be used to reduce the number of attributes into principle components. Based on a calculations generated on a server or using distributed systems, the local device can use these calculations to generate the principal components from locally produced data (such as the identifiers of the other users who have each song, as determined by their incoming profiles); these can be summarized to produce a taste profile for the user. Thus it is possible to arrive at a manageable number of attributes for individual songs and local taste profiles. Those of ordinary skill in the art of statistical factor analysis will see how to do this.

In many embodiments having attributes associated with each song (comprising a song taste profile), which correspond well enough to the attributes of a summarized taste profile for the local user that similarity can be measured between the two types of taste profiles, recommendations are generated by using the songs whose taste profiles most closely match the local user's taste profile. Thus instead of the process of finding nearest neighbor users and deriving recommendations from their likes and interests, the nearest neighbors are themselves recommendable items and the nearest ones are therefore recommended.

Some embodiments need no two-way nodes. The portable devices calculate which incoming songs are nearest-neighbors without any data from other user nodes. Note that while human input may be used to decide on the appropriate attribute values for each song, this input need not be done on "user nodes" as we use the term elsewhere in this specification. Rather that data may be input through software specially designed for the manual entry of such data by a someone whose job it is to do that analysis work.

To envision a more concrete example of the invention described in the previous paragraph satellites broadcast taste profile information for each song. These may be broadcast at the same time as the songs by interleaving the music data with the song data or by using another channel, or they may be broadcast at other times. In a system where a broadcast schedule is broadcast in advance of broadcasting the songs, it is preferable that the song taste profiles are broadcast a substantial amount of time before the songs themselves so that software may automatically schedule the future recording of very similar songs. As described earlier the user's local taste profile is refined over time due to input from a Save button or other passive or active indications of taste, and the portable device may never have any two-way connectivity. So using the portable device's CPU to find nearest neighbor songs based on user taste profiles built up on the local machine and compatible taste profile broadcast from the satellites produces a situation where analysis of each song, using human and/or software input, empowers portable devices to adaptively provide ever more appropriate listening material for users.

It should be noted that the above example if for example only and must not be construed to limit the scope of the invention. The role of "portable device" in the example may be played by any CPU-enabled device, including a desktop PC, or a unit built into an automobile or airplane.

When the term "satellite" or "satellites" is used in this specification, it should be noted that whether there is one or more than one satellite makes no difference from the standpoint of this invention. Although of course a collection of satellites will provide a broader range of coverage than a single satellite. One advantage of the techniques described here is that, especially in embodiments where the song taste profiles are transmitted in close temporal proximity to the song data, a portable device is enabled to acquire a library of satellite-downloaded music that the user may continue to enjoy even if the device goes out of range of the satellite(s) for some time.

In another set of variations, no taste profiles are sent from the satellites. Instead, a software analysis of each song is done in the portable device itself, determining values for attributes such as tempo. Software to do this sort of thing exists today in, for example, the Polyphonic HMI's Hit Song Science technology. Any engineer of ordinary skill and access to such software will see how to use integrate it into the present invention. Thus song taste profiles generated by such software play the same role as downloaded song taste profiles do in other embodiments described above. However, there is a substantial advantage to downloading the song taste profiles: present software does not have the ability to examine song data for such attributes as sense of humor in the lyric. There are many such qualities that pertain to recorded music that software is not currently capable of analyzing. So embodiments based wholly on software analysis of the music can be expected not to produce as much user benefit as embodiments involving at least some human analysis of the songs. For spoken-word content, speech-to-text software can determine many of the words spoken, and those can be mapped to content vectors as is often done for document analysis; that can comprise the item taste profiles.

While the above specification focuses on songs for reasons of example, the same approach will also accrue to spoken-word recordings, "podcasts" involving music played at intervals with spoken-word in between, and video and even purely visual content.

For example, one set of embodiments is based upon an LCD, plasma, or nanotube display hanging on a wall. It displays different images, which may be moving or still, which it receives from a satellite. Taste profiles are downloaded which contain attributes pertaining to each visual item; in some embodiments the taste profiles contain identifiers of other users who like the visual item supplied by users with two-way network connections; in other cases or in combination with such human identifiers, taste profiles containing attributes such as indications of the presence of various colors, hard or soft edges, and whether the image is realistic or abstract, landscape or portrait, etc.; in some embodiments software analysis within the local device produces a taste profile; for instance such information as color is simple to extract from digital image data, there is existing software, used to block pornographic sites, which can discern such characteristics as the presence of bare human skin.

There is a Save button that protrudes slightly from a frame that surrounds the "picture". When the user sees an image he particularly likes, he presses Save, and then that image is stored into persistent storage by a CPU which is embedded into the device and displayed later. The CPU also makes use of that information to improve a local taste profile representing the user's tastes. This enables the device to acquire more visual items that the user will enjoy, as described above for music.

Another set of variations of the invention here as it relates to one-way devices but also as it relates to purely two-way node embodiments described elsewhere in this specification is similarity matching by means of pattern-matching technologies. For example, a song would be represented, instead of (or in addition to) a taste profile containing a list of attributes, by a pattern-matching software. For instance, it could be represented by a neural net, with the number of layers and nodes and the numerical values that are intrinsic to the net being defined in a way that takes a local user's taste profile information and outputs a high value if the song is likely to match the user's tastes and a low value if it is not. As one way of finding the necessary values, the neural net can be trained using taste profile data of users who had two-way connections enabling the profiles to be communicated to a central server. The neural net is trained so that it takes the taste profiles as input, and outputs high or low values depending on whether the user that is currently trained on liked the song or not (for instance based on whether he pressed a Save button or did nothing or "fast forwarded" past a song and never listened to it in its entirety; in such a case the net would preferably be trained to output a numerical value with a high value in the first case, a middle value in the second, and a low value in the third). In order that there are input values to train the neural nets, taste profiles based on song attributes are also provided, and a user taste profile to be input into the artificial intelligence unit is generated based on the ones associated with the songs the user likes (and/or does not like).

In some embodiments content items such as songs are accompanied by lists of identifiers of other songs that are considered to be likely to be enjoyed by the same people as the current song, as determined, for example, either by having similar sonic and/or lyrical attributes, or tending to be liked (or purchased by), the same people. These identifiers may be used as attributes for nearest-neighbor matching, but they may also be used as simple indicators that the listed song identifiers may be used to schedule the acquisition of those other songs if the user likes the current one (as indicated, for example, by pressing a Save button while listening to it).

In some embodiments incorporating the virtual channel concept described above, when the user first starts the player, and selects a virtual channel, if there aren't many songs (or are no songs) stored in the device yet, it may start playing the currently-being-broadcast song from one of the user's favorite channels, and follow that up with a song from storage if one is available, or play a song from one of the user's favorite channels.

When playing songs from the user's favorite channels, it may receive broadcasts from more than one channel at a time, and play one song while simultaneously caching another song from another channel into RAM of persistent storage; after the first song is complete it may play a song from another channel.

APPENDIX 6

This Appendix describes a class of embodiments wherein there is two way communication between nodes, but it is limited to a particular geographical area, being enabled by such wireless technologies as Wi-Fi or Bluetooth or the like.

When two wireless-enabled portable devices are in close enough proximity that communications may be automatically established, a link is set up between the two devices. (Communications may occur between more than two devices simultaneously, but for simplicity of example we are focusing the interactions between one pair at a time.) For instance, a link may be established between two devices in different automobiles or between two handheld devices such as cellular phones.

All or a substantial portion of the music library identifiers in each device comprises the taste profile of that devices. It is communicated to the other device by wireless means. The similarity of the other user to the local user is calculated by means of the taste profiles (by local user we mean the person whose information is in one of the two devices). If the other user's taste profile makes it one of the N most similar ones seen by the local user's device, where N is a predetermined number, the taste profile is stored and used for recommendation purposes as described elsewhere in this specification.

Note that very similar, but older, taste profiles may be deleted, and thus there may be more N chosen for storage over the course of time.

In preferred embodiments, for a subscription fee, the devices are allowed to copy music from one device to another. If a track residing on a device to which the local user is currently connected has a highly recommended song on it, it is transferred to the local device either automatically or after suggesting the transfer and waiting for the user to OK it (for instance, by pressing a button on the device in response to an onscreen notification). In other embodiments, the device keeps track of how many times the user has played a song, and to play it more than (for instance) three times, the user must buy the track. This transaction occurs at the time it is connected to the wired Internet (either through a wireless base station, a direct Ethernet connection, or a connection via USB, FireWire, or the like to a desktop PC which is connected to the Internet).

In further preferred embodiments, the data corresponding to each song may contain an indicator (such as a bit or particular byte value) indicating that certain songs are free—in other words they can be legally transferred between devices without legal or copyright hindrance. In that case transfers occur as described above but, in the absence of a paid subscription, only the free songs may be transferred.

Practitioners of the art of creating wireless networking hardware and software, such as Bluetooth and Wi-Fi, will readily see how to handle the connectivity aspects described in this Appendix.

INDUSTRIAL APPLICABILITY

The present invention is desirably implemented at least in part via a public network or internet, although some embodiments make use of satellite transmissions and/or wireless transmissions directly from device to device. It may, for example, be coupled to a private network or intranet through a firewall server or router. As used herein, the term "internet"

generally refers to any collection of distinct networks working together to appear as a single network to a user. The term "Internet", on the other hand, refers to a specific implementation of internet, the so-called world wide "network of networks" that are connected to each other using the Internet protocol (IP) and other similar protocols. The Internet provides file transfer, remote log in, electronic mail, news and other services. The system and techniques described herein can be used on any internet including the so-called Internet.

One of the unique aspects of the Internet system is that messages and data are transmitted through the use of data packets referred to as "datagrams." In a datagram-based network, messages are sent from a source to a destination in a manner similar to a government mail system. For example, a source computer may send a datagram packet to a destination computer regardless of whether or not the destination computer is currently powered on and coupled to the network. The Internet protocol (IP) is completely sessionless, such that IP data gram packets are not associated with one another.

The firewall server or router is a computer or item of equipment which couples the computers of a private network to the Internet. It may thus act as a gatekeeper for messages and datagrams going to and from the Internet 1.

An Internet service provider (ISP) is also coupled to the Internet. A service provider is an entity that provides connections to a part of the Internet, for a plurality of users. Also coupled to the Internet are a plurality of web sites or nodes. When a user wishes to conduct a transaction at one of the nodes, the user accesses the node through the Internet.

For Internet-enabled embodiments, each node is configured to understand which firewall and node to send data packets to given a destination IP address. This may be implemented by providing the firewalls and nodes with a map of all valid IP addresses disposed on its particular private network or another location on the Internet. The map may be in the form of prefix matches up to and including the full IP address.

Also coupled to the Internet is a server, containing an information database with representations of user profiles and associated user identifiers 5. The information may be stored, for example, as a record or as a file. The information associated with each particular user is stored in a particular data structure in a database. One exemplary database structure is as follows. The database may be stored, for example, as an object-oriented database management system (ODBMS), a relational database management system (e.g. DB2, SQL, etc.), a hierarchical database, a network database, a distributed database (i.e. a collection of multiple, logically interrelated databases distributed over a computer network) or any other type of database package. Thus, the database and the system can be implemented using object-oriented technology or via text files.

A computer system on which the system of the present invention may be implemented may be, for example, a personal computer running Microsoft Windows, Linux, Apple Macintosh or an equivalent operating system. Such a computer system typically includes a central processing unit (CPU), e.g., a conventional microprocessor, a random access memory (RAM) for temporary storage of information, and a read only memory (ROM) for permanent storage of information. Each of the aforementioned components is coupled to a bus. The operating system controls allocation of system resources and performs tasks such as processing, scheduling, memory management, networking, and I/O services. Also coupled to the bus is typically a non-volatile mass storage device which may be provided as a fixed disk drive which is coupled to the bus by a disk controller.

Data and software may be provided to and extracted from computer system via removable storage media such as hard disk, diskette, and CD ROM. For example, data values generated using techniques described herein may be stored on storage media. The data values may then be retrieved from the media by the CPU and utilized to recommend one of a plurality of items in response to a user's query.

Alternatively, computer software useful for performing computations related to enabling recommendations and community by massively-distributed nearest-neighbor searching may be stored on storage media. Such computer software may be retrieved from the media for immediate execution by the CPU or by processors included in one or more peripherals. The CPU may retrieve the computer software and subsequently store the software in RAM or ROM for later execution.

User input to the computer system may be provided by a number of devices. For example, a keyboard and a mouse are typically coupled to the bus by a controller. The computer system typically also includes a communications adapter which allows the system to be interconnected to a local area network (LAN) or a wide area network (WAN). Connections may be wireless or wired, Thus, data and computer program software can be transferred to and from the computer system via the adapter, bus and network; although it should be noted that in embodiments without two-way connectivity, the device manufacturer may load the software onto the device.

The invention claimed is:

1. A portable content-playing device for playing digital content communicated along with related data from at least one satellite, comprising
    radio communication hardware for receiving data from said at least one satellite,
    a central processing unit and supporting hardware including random access memory and persistent storage,
    said persistent storage storing data including locally-stored digital content and taste profile data and software programs,
    said taste profile data including a local taste profile representing the tastes associated with said locally-stored digital content as represented by at least one selected from the group consisting of active indicators of taste and passive indicators of taste,
    said software programs including a software program for downloading other taste profiles from said at least one satellite,
    said software programs including a software program for computing similarity values between said local taste profile and downloaded other taste profiles,
    said software programs including a software program for deciding which digital content to play based upon said similarity values,
    whereby a virtual channel is constructed automatically by inference from said local taste profile and downloaded other taste profiles for the benefit of that user to enable that user to have the experience of a digital content channel specifically geared towards that user's individual tastes.

2. The portable content-playing device of claim 1 wherein said digital content comprises at least one selected from the group consisting of audio content and video content.

3. The portable content-playing device of claim 1 further comprising means for acting as a one-way node or two-way node at different times.

4. The portable content-playing device of claim 1 wherein said other taste profiles represent the tastes of other human users as represented by local taste profiles on portable content-playing devices associated with those users.

5. The portable content-playing device of claim 4 wherein said local taste profiles are user taste profiles additionally including at least one digital content identifier.

6. The portable content playing device of claim 5, wherein:
said software program for deciding which digital content to play includes means for identifying the most similar of said other taste profiles to said local taste profile,
said software program for deciding which digital content to play making that decision based upon said at least one digital content identifier associated with said most similar of said other taste profiles.

7. The portable content-playing device of claim 1 wherein said other taste profiles are digital content taste profiles.

8. The portable content-playing device of claim 7 wherein the digital content items associated with the ones of said digital content taste profiles that are found by said software program for computing similarity values to be most similar to said local taste profiles are played in said virtual channel.

9. The portable content-playing device of claim 1 wherein said device includes a passive indicator of taste comprising a save button enabling the user to indicate that the user wishes to save the digital content item being played at the time the button is pressed so that it may played again later.

10. The portable content-playing device of claim 9 wherein said digital content consists of at least one selected from the group consisting of audio content and video content.

11. The portable content-playing device of claim 9 further comprising means for acting as a one-way node or two-way node at different times.

12. The portable content-playing device of claim 9 wherein said other taste profiles represent the tastes of other human users as represented by the local taste profiles on portable content-playing devices associated with those users.

13. The portable content-playing device of claim 12 wherein said local taste profiles are user taste profiles additionally including at least one digital content identifier.

14. The portable content playing device of claim 13, wherein:
said software program for deciding which digital content to play includes means for identifying the most similar of said other taste profiles to said local taste profile,
said software program for deciding which digital content to play making that decision based upon said at least one digital content identifier associated with said most similar of said other taste profiles.

15. The portable content-playing device of claim 9 wherein said other taste profiles are digital content taste profiles.

16. The portable content-playing device of claim 15 wherein the digital content items associated with the ones of said digital content taste profiles that are found by said software program for computing similarity values to be most similar to said local taste profiles are played in said virtual channel.

17. The portable content-playing device of claim 1, wherein it is adapted to act as a one-way node.

18. The portable content-playing device of claim 1, wherein it is adapted to act as a two-way node.

19. An entertainment system comprising
at least one satellite for communicating digital content and related data and a plurality of portable content-playing devices comprising at least one selected from the group consisting of one-way nodes and two-way nodes,
said portable content-playing devices including radio communication hardware for receiving data from said at least one satellite,
said portable content-playing devices additionally including a central processing unit and supporting hardware such as random access memory and persistent storage,
said persistent storage storing data including locally-stored digital content and taste profile data and software programs,
said taste profile data including a local taste profile representing the tastes associated with said locally-stored digital content as represented by at least one selected from the group consisting of active indicators of taste and passive indicators of taste,
said software programs including a software program for downloading other taste profiles from said at least one satellite,
said software programs including a software program for computing similarity values between said local taste profile and downloaded taste profiles,
said software programs including a software program for deciding which digital content to play based upon said similarity values,
whereby a virtual channel is constructed automatically by inference from said local taste profile and downloaded other taste profiles for the benefit of that user to enable that user to have the experience of a digital content channel specifically geared towards that user's individual tastes.

* * * * *